United States Patent
Eitan et al.

(10) Patent No.: US 9,825,782 B2
(45) Date of Patent: Nov. 21, 2017

(54) CHANNEL ESTIMATION

(71) Applicant: QUALCOMM Incorporated, San Diego, CA (US)

(72) Inventors: Alecsander Eitan, Haifa (IL); Amichai Sanderovich, Atlit (IL); Gal Basson, Haifa (IL)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 15/219,202

(22) Filed: Jul. 25, 2016

(65) Prior Publication Data
US 2017/0033949 A1 Feb. 2, 2017

Related U.S. Application Data

(60) Provisional application No. 62/197,524, filed on Jul. 27, 2015.

(51) Int. Cl.
*H03K 9/00* (2006.01)
*H04L 25/02* (2006.01)
(Continued)

(52) U.S. Cl.
CPC ...... *H04L 25/0204* (2013.01); *H04L 25/0232* (2013.01); *H04L 25/03949* (2013.01);
(Continued)

(58) Field of Classification Search
CPC ............. H04L 25/0204; H04L 25/0206; H04L 25/0208; H04L 27/2675; H04L 27/2602;
(Continued)

(56) References Cited

U.S. PATENT DOCUMENTS

2010/0080266 A1* 4/2010 Zhang ............... H04J 13/102
375/140
2013/0121245 A1* 5/2013 Vermani ............ H04L 1/0025
370/328
(Continued)

FOREIGN PATENT DOCUMENTS

WO   WO-2005018180 A1   2/2005
WO   WO-2013100930 A1   7/2013
(Continued)

OTHER PUBLICATIONS

International Search Report and Written Opinion—PCT/US2016/044108—ISA/EPO—Sep. 26, 2016.

*Primary Examiner* — Rahel Guarino
(74) *Attorney, Agent, or Firm* — Loza & Loza LLP

(57) ABSTRACT

Certain aspects of the present disclosure provide an apparatus for wireless communications. The apparatus comprises an interface configured to receive a plurality of channel estimation sequences, wherein each one of the plurality of channel estimation sequences is received on a respective one of a plurality of channels, each one of the plurality of channels having a respective one of a plurality of frequency bands. The apparatus also comprises a processing system configured to generate a channel estimation for each one of the plurality of channels using the respective one of the plurality of channel estimation sequences, and to generate a collective channel estimation based on the channel estimations.

18 Claims, 17 Drawing Sheets

(51) Int. Cl.
*H04L 25/03* (2006.01)
*H04L 27/10* (2006.01)
*H04L 27/26* (2006.01)

(52) U.S. Cl.
CPC .......... *H04L 27/10* (2013.01); *H04L 27/2602* (2013.01); *H04L 27/2613* (2013.01)

(58) Field of Classification Search
CPC .......... H04L 27/2613; H04L 25/03949; H04L 25/0232; H04L 27/10; H04W 84/12
USPC ....... 375/267, 316, 260, 150, 142, 343, 347; 370/464
See application file for complete search history.

(56) References Cited

U.S. PATENT DOCUMENTS

2013/0266088 A1* 10/2013 Kim ................... H04L 5/0048
375/296
2015/0156036 A1* 6/2015 Genossar ............ H04L 25/0202
375/232
2016/0192363 A1* 6/2016 Kasher ................ H04L 5/00
370/329

FOREIGN PATENT DOCUMENTS

WO  WO-2016094542 A2  6/2016
WO  WO-2016105831 A1  6/2016

\* cited by examiner

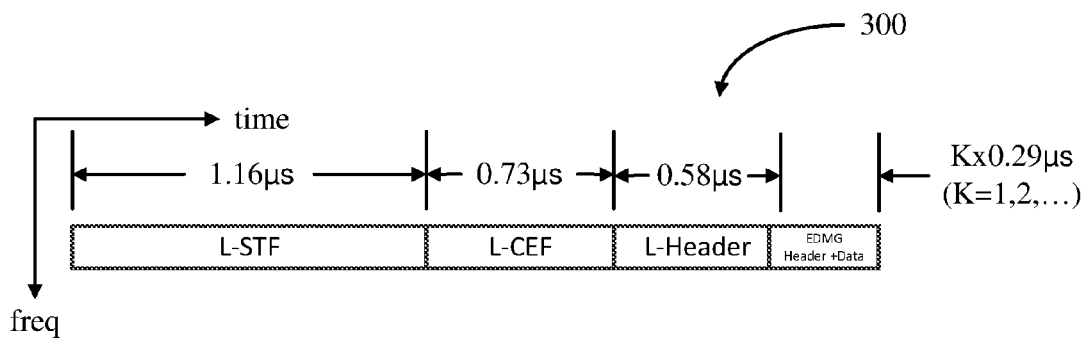

FIG. 3A

| Description | Bits | Notes |
|---|---|---|
| Payload data Length | 24 | |
| EDMG Header Number of LDPC blocks | 10 | Value is +1 (when this field is 0, it means 1 LDPC block) |
| Spatial streams | 4 | 1..16 |
| Channels | 3 | 1..8 |
| Channel Offset | 3 | 0..7 (The offset of this channel in the channel bonding) |
| 11ay MCS | 6 | |
| GI mode | 1 | Short or Long GI |
| FFT mode | 1 | Short or Long FFT |
| LDPC mode | 1 | Short (same as 11ad) or Long |
| Power difference | 4 | 0..15 dB |
| Reserved bits | 23 | |
| Proprietary bits | 8 | |
| CRC | 16 | |
| Total: | 104 | bits |

FIG. 3B

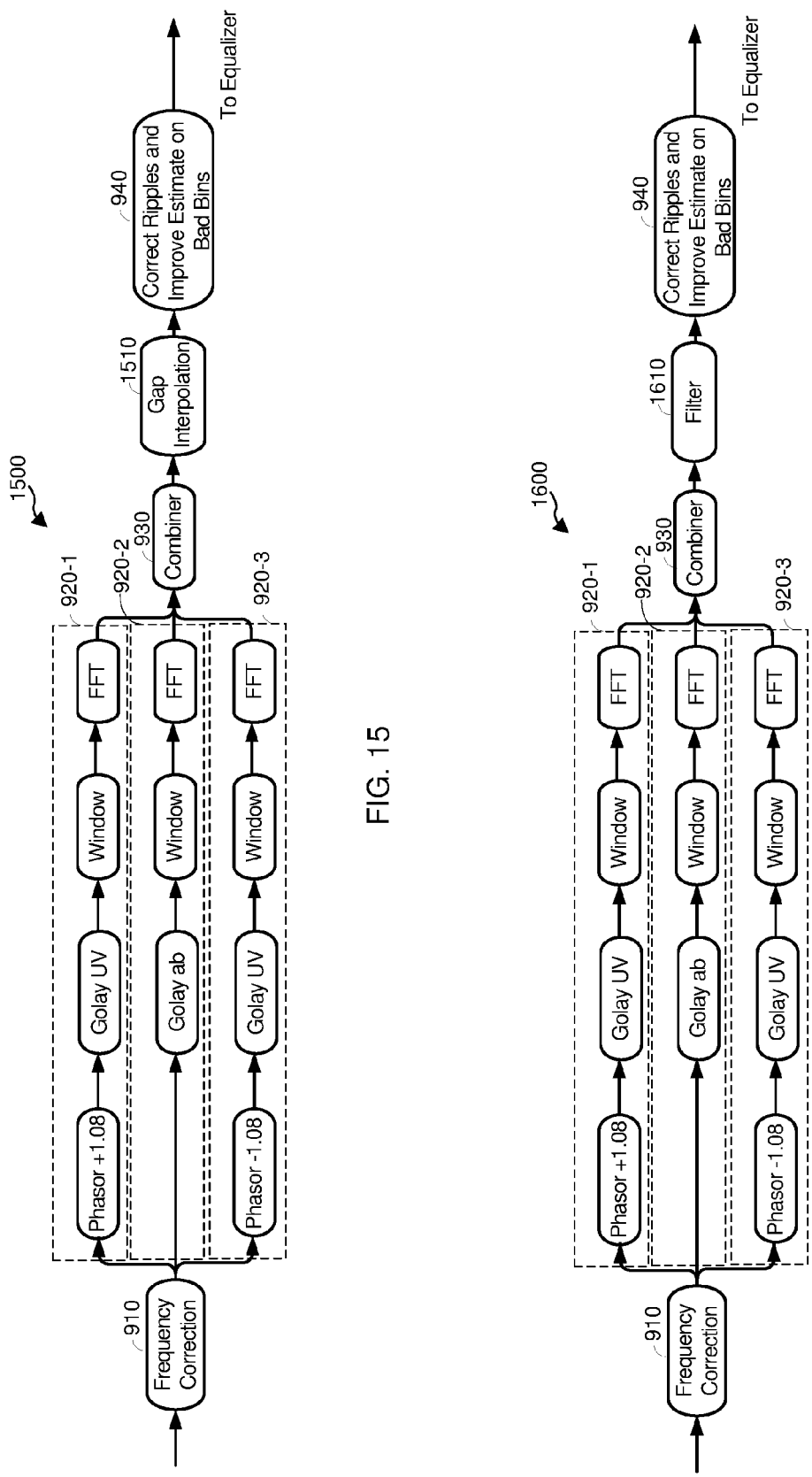

CHANNEL ESTIMATION

CROSS-REFERENCE TO RELATED APPLICATION

This application claims the benefit of the filing date of U.S. Provisional Application Ser. No. 62/197,524, filed on Jul. 27, 2015, and entitled "Channel Estimation," which is incorporated herein by reference.

FIELD

Certain aspects of the present disclosure generally relate to wireless communications and, more particularly, to channel estimation.

BACKGROUND

In order to address the issue of increasing bandwidth requirements demanded for wireless communications systems, different schemes are being developed. In some schemes, data is wirelessly transmitted at high data rates (e.g., several Gigabits/s) over one or more channels in the 60 GHz range.

SUMMARY

A first aspect relates to an apparatus for wireless communications. The apparatus comprises an interface configured to receive a plurality of channel estimation sequences, wherein each one of the plurality of channel estimation sequences is received on a respective one of a plurality of channels, each one of the plurality of channels having a respective one of a plurality of frequency bands. The apparatus also comprises a processing system configured to generate a channel estimation for each one of the plurality of channels using the respective one of the plurality of channel estimation sequences, and to generate a collective channel estimation based on the channel estimations.

A second aspect relates to a method for wireless communications. The method comprises receiving a plurality of channel estimation sequences, wherein each one of the plurality of channel estimation sequences is received on a respective one of a plurality of channels, each one of the plurality of channels having a respective one of a plurality of frequency bands. The method also comprises generating a channel estimation for each one of the plurality of channels using the respective one of the plurality of channel estimation sequences, and generating a collective channel estimation based on the channel estimations.

A third aspect relates to an apparatus for wireless communications. The apparatus comprises means for receiving a plurality of channel estimation sequences, wherein each one of the plurality of channel estimation sequences is received on a respective one of a plurality of channels, each one of the plurality of channels having a respective one of a plurality of frequency bands. The apparatus also comprises means for generating a channel estimation for each one of the plurality of channels using the respective one of the plurality of channel estimation sequences, and means for generating a collective channel estimation based on the channel estimations.

A fourth aspects relates to a computer-readable medium comprising instructions stored thereon for receiving a plurality of channel estimation sequences, wherein each one of the plurality of channel estimation sequences is received on a respective one of a plurality of channels, each one of the plurality of channels having a respective one of a plurality of frequency bands. The computer-readable medium also comprises instructions for generating a channel estimation for each one of the plurality of channels using the respective one of the plurality of channel estimation sequences, and generating a collective channel estimation based on the channel estimations.

A fifth aspect relates to a wireless node. The wireless node comprises at least one antenna, and a receiver configured to receive, via the at least one antenna, a plurality of channel estimation sequences, wherein each one of the plurality of channel estimation sequences is received on a respective one of a plurality of channels, each one of the plurality of channels having a respective one of a plurality of frequency bands. The wireless node also comprises a processing system configured to generate a channel estimation for each one of the plurality of channels using the respective one of the plurality of channel estimation sequences, and to generate a collective channel estimation based on the channel estimations.

BRIEF DESCRIPTION OF THE DRAWINGS

FIG. 3A illustrates an exemplary frame or frame portion in accordance with certain aspects of the present disclosure.

FIG. 3B illustrates an exemplary Extended Directional Multigigabit (EDMG) Header in accordance with certain aspects of the present disclosure.

FIG. 15 illustrates an exemplary channel estimation subsystem using gap interpolation to improve channel estimation in small gaps between adjacent channels in accordance with certain aspects of the present disclosure.

FIG. 16 illustrates an exemplary channel estimation subsystem comprising a filter for reducing noise in a channel estimation in accordance with certain aspects of the present disclosure.

DETAILED DESCRIPTION

Figure 1:
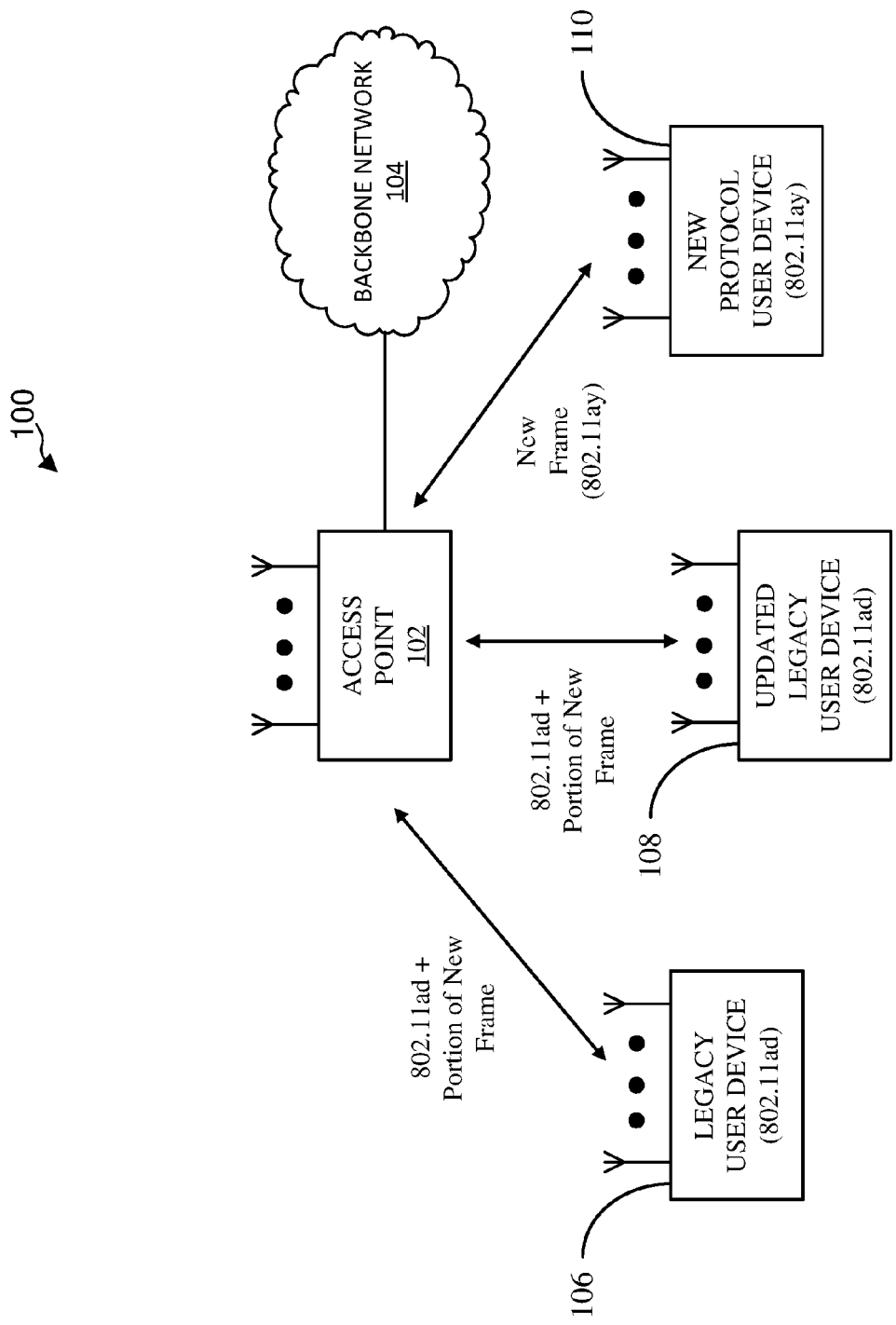
FIG. 1 illustrates an exemplary wireless communication system in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple access terminals. A TDMA system may allow multiple access terminals to share the same frequency channel by dividing the transmission signal into different time slots, each time slot being assigned to different access terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

With reference to the following description, it shall be understood that not only communications between access points and user devices are allowed, but also direct (e.g., peer-to-peer) communications between respective user devices are allowed. Furthermore, a device (e.g., an access point or user device) may change its behavior between a user device and an access point according to various conditions. Also, one physical device may play multiple roles: user device and access point, multiple user devices, multiple access points, for example, on different channels, different time slots, or both.

FIG. 1 is a diagram of an exemplary wireless communications network 100 in accordance with certain aspects of the present disclosure. The communication network 100 comprises an access point 102, a backbone network 104, a legacy user device 106, an updated legacy user device 108, and a new protocol user device 110.

The access point 102, which may be configured for a wireless local area network (LAN) application, may facilitate data communications between the user devices 106, 108, and 110. The access point 102 may further facilitate data communications between devices coupled to the backbone network 104 and any one or more of the user devices 106, 108, and 110.

In this example, the access point 102 and the legacy user device 106 data communicate between each other using a legacy protocol. One example of a legacy protocol includes IEEE 802.11ad. According to this protocol, data communications between the access point 102 and the legacy user device 106 are effectuated via transmission of data frames that comply with the 802.11ad protocol. As discussed further herein, an 802.11ad data frame includes a preamble consisting of a legacy short training field (L-STF) and a legacy channel estimation sequence (L-CES) (now more commonly referred to as a legacy channel estimation field (L-CEF)), a legacy header (L-Header), a data payload, and an optional beamforming training field.

The L-STF sequence includes a plurality of Golay sequences ($Ga_{128}$) and a negative Golay sequence ($-Ga_{128}$) to signify the end of the L-STF sequence. The L-STF sequence may assist a receiver in setting up its automatic gain control (AGC), timing, and frequency setup for accurately receiving the rest of the frame and subsequent frames. In the case of a single carrier (SC) transmission mode, the L-CEF sequence includes a $Gu_{512}$ sequence (consisting of the following concatenated Golay sequences ($-Gb_{128}$, $-Ga_{128}$, $Gb_{128}$, $-Ga_{128}$) followed by a $Gv_{512}$ sequence (consisting of the following concatenated Golay sequences ($-Gb_{128}$, $Ga_{128}$, $-Gb_{128}$, $-Ga_{128}$), and ending with a $Gv_{128}$ (same as $-Gb_{128}$) sequence. In the case of an orthogonal frequency division multiplexing (OFDM) transmission mode, the L-CEF sequence includes a $Gv_{512}$ sequence followed by a $Gu_{512}$ sequence, and ending with a $Gv_{128}$ sequence. The L-CEF sequence assists the receiver in estimating the channel frequency response through which the frame is sent.

The L-Header includes various information about the frame. Such information includes a scrambler initiation field, which specifies a seed for the scrambling applied to the remainder of the L-Header and the data payload for data whitening purposes. The L-Header also includes the modulation and coding scheme (MCS) field to indicate one out of 12 defined MCS used for transmitting the data payload of the frame. The L-Header includes a length field to indicate the length of the data payload in octets. The L-Header further includes a training length field to indicate a length of the optional beam forming training sequence at the end of the frame. Additionally, the L-Header includes a packet type field to indicate whether the optional beam forming field pertains to transmission or reception. Further, the L-Header includes a header checksum (HCS) field to indicate a CRC-32 checksum over the header bits.

Referring again to FIG. 1, the legacy user device 106 is capable of decoding the entire 802.11ad data frame. The new frame disclosed herein, which may be subsequently adopted for the new standard or protocol 802.11ay, provides some backward compatibility feature. As discussed in more detail herein, the new frame includes the preamble (L-STF and L-CEF) and the L-Header of the 802.11ad, and one or more additional portions pertaining to the new protocol. Accordingly, the legacy user device 106 is configured to decode the 802.11ad preamble (L-STF and L-CEF) and L-Header portion of the new frame, but is not configured to decode the remaining portion of the new frame. The legacy user device 106 may decode the 802.11ad preamble and header portion of the new frame in order to calculate a network allocation vector (NAV) to determine the length of the new frame for transmission collision avoidance purposes.

The updated legacy user device 108 also operates under the legacy 802.11ad protocol, and is able to communicate with the access point 102 using 802.11ad data frames. However, the frame processing capability of the updated legacy user device 108 has been updated to interpret certain bits in the L-Header of the new frame that indicate an attribute of the new frame, as discussed further herein. In accordance with the legacy 802.11ad protocol, these bits are allocated to least significant bits (LSB) of the data length in the L-Header. But, in accordance with the new frame, the otherwise allocated bits of the L-Header are used to indicate a transmission power difference between a first portion of the new frame and a second portion of the new frame in accordance with a certain transmission mode associated with the new frame. These bits allow the updated legacy user device 108 to anticipate the power difference (an increase) for signal interference management purposes. Although, in this example, the allocation of the LSB length bits signifies the aforementioned power difference, it shall be understood that these bits may be allocated for other purposes.

The new protocol user device 110 is capable of communicating with the access point 102 using the new data frame, which some or all features of the new frame may be adopted for the 802.11ay protocol. As discussed further herein, the new data frame includes the legacy 802.11ad preamble (L-STF and L-CEF) and L-Header, with the L-Header slightly modified to indicate the transmission mode associated with the new frame and, as previously discussed, a transmission power difference between a first portion of the new frame and a second portion of the new frame. The slight modification to the L-Header of the new frame does not impact the decoding of the L-Header by the legacy user device 106 and the updated legacy user device 108. The bits in the L-Header of the new frame that indicate the transmission mode are reserved bits in the standard 802.11ad legacy header.

In addition to the legacy preamble (L-STF and L-CEF) and L-Header, the new frame further comprises an Extended Directional Multigigabit (EDMG) Header. As discussed in more detail herein, the EDMG Header comprises a plurality of fields for indicating various attributes of the new frame. Such attributes includes payload data length, number of low density parity check (LDPC) data blocks in the EDMG Header, the number of spatial streams supported, the number of bonded channels, the leftmost (lowest frequency) channel of the bonded channels, the MCS used for the data payload of the new frame, the transmit power difference between different portions of the frame, and other information. The EDMG Header may further be appended with payload data that is not in the data payload portion (now commonly referred as the EDMG data payload) of the new frame. For short messages, all of the payload data may appended to the EDMG Header, thereby avoiding the need for transmitting the "separate" EDMG data payload of the new frame, which adds significant overhead to the frame.

The new data frame is configured to provide additional features to improve data throughput by employing higher data modulation schemes, channel bonding, channel aggregation, and improved spatial transmission via multiple input multiple output (MIMO) antenna configurations. For instance, the legacy 802.11ad protocol includes BPSK, QPSK, and 16QAM available modulation schemes. According to the new protocol, higher modulation schemes, such as 64QAM, 64APSK, 128APSK, 256QAM, and 256APSK are available. Additionally, a plurality of channels may be bonded or aggregated to increase data throughput. Further, such bonded or aggregated channels may be transmitted by way of a plurality of spatial transmissions using a MIMO antenna configuration.

Figure 2:
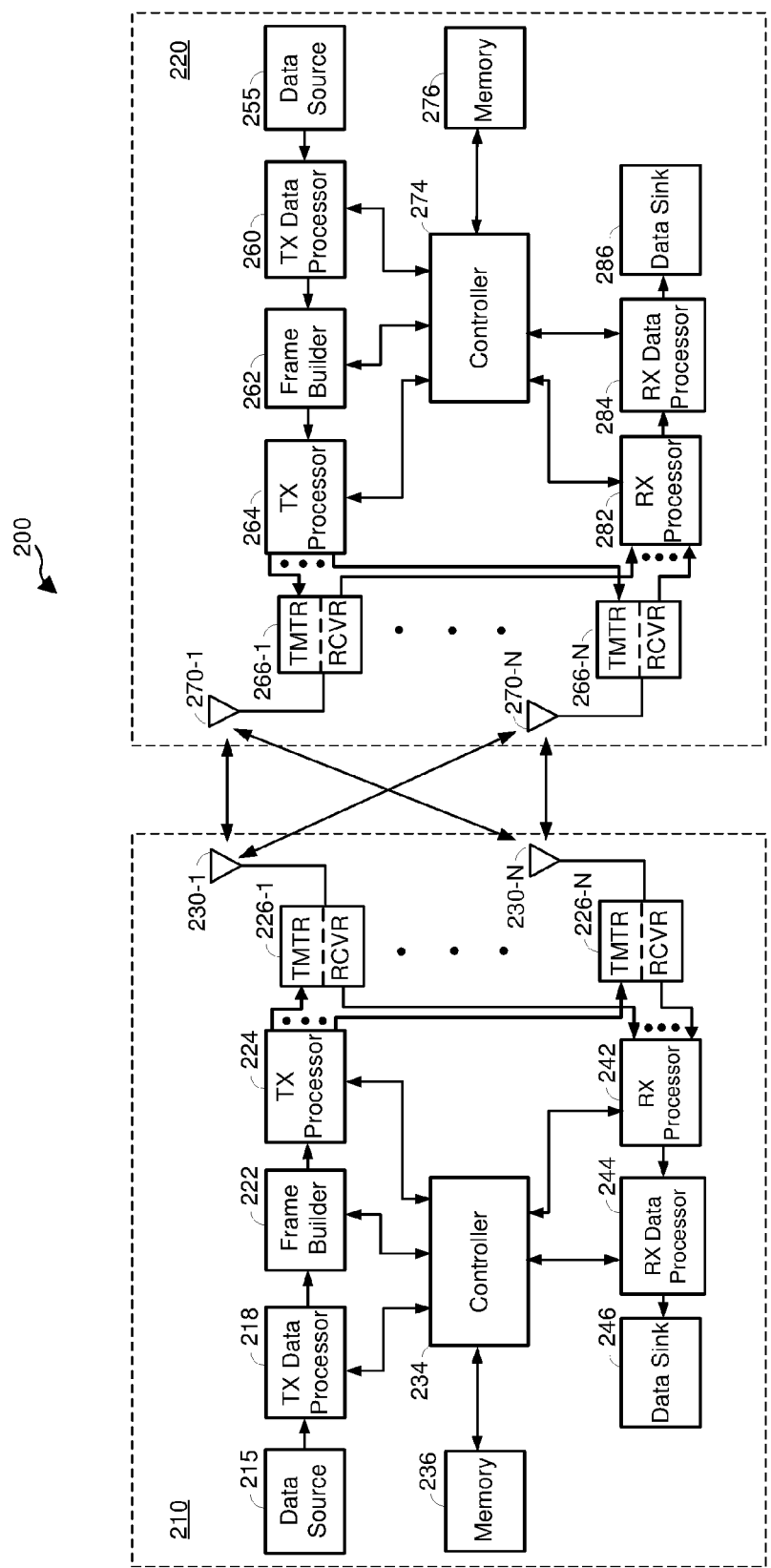
FIG. 2 is a block diagram of an exemplary access point and access terminal in accordance with certain aspects of the present disclosure.

FIG. 2 illustrates a block diagram of an access point 210 (generally, a first wireless node) and an access terminal 220 (generally, a second wireless node) of the wireless communication system 200. The access point 210 is a transmitting entity for the downlink and a receiving entity for the uplink. The access terminal 220 is a transmitting entity for the uplink and a receiving entity for the downlink. As used herein, a "transmitting entity" is an independently operated apparatus or wireless node capable of transmitting data via a wireless channel, and a "receiving entity" is an independently operated apparatus or wireless node capable of receiving data via a wireless channel.

Although, in this example, wireless node 210 is an access point and wireless node 220 is an access terminal, it shall be understood that the wireless node 210 may alternatively be an access terminal, and wireless node 220 may alternatively be an access point. The wireless node 210 may be used to implement the access point 102 in FIG. 1, and the wireless node 220 may be used to implement any one of the user devices 106, 108 and 110 in FIG. 1.

For transmitting data, the access point 210 comprises a transmit data processor 218, a frame builder 222, a transmit processor 224, a plurality of transceivers 226-1 to 226-N, and a plurality of antennas 230-1 to 230-N. The access point 210 also comprises a controller 234 configured to control operations of the access point 210, as discussed further below.

In operation, the transmit data processor 218 receives data (e.g., data bits) from a data source 215, and processes the data for transmission. For example, the transmit data processor 218 may encode the data (e.g., data bits) into encoded data, and modulate the encoded data into data symbols. The transmit data processor 218 may support different modulation and coding schemes (MCSs). For example, the transmit data processor 218 may encode the data (e.g., using low-density parity check (LDPC) encoding) at any one of a plurality of different coding rates. Also, the transmit data processor 218 may modulate the encoded data using any one of a plurality of different modulation schemes, including, but not limited to, BPSK, QPSK, 16QAM, 64QAM, 64APSK, 128APSK, 256QAM, and 256APSK.

In certain aspects, the controller 234 may send a command to the transmit data processor 218 specifying which modulation and coding scheme (MCS) to use (e.g., based on channel conditions of the downlink), and the transmit data processor 218 may encode and modulate data from the data source 215 according to the specified MCS. It is to be appreciated that the transmit data processor 218 may perform additional processing on the data such as data scrambling, and/or other processing. The transmit data processor 218 outputs the data symbols to the frame builder 222.

The frame builder 222 constructs a frame (also referred to as a packet), and inserts the data symbols into a data payload of the frame. Exemplary frame structures or formats are discussed further below. The frame builder 222 outputs the frame to the transmit processor 224. The transmit processor 224 processes the frame for transmission on the downlink. For example, the transmit processor 224 may support different transmission modes such as an orthogonal frequency-division multiplexing (OFDM) transmission mode and a single-carrier (SC) transmission mode. In this example, the controller 234 may send a command to the transmit processor 224 specifying which transmission mode to use, and the transmit processor 224 may process the frame for transmission according to the specified transmission mode.

In certain aspects, the transmit processor 224 may support multiple-output-multiple-input (MIMO) transmission. In these aspects, the access point 210 includes multiple antennas 230-1 to 230-N and multiple transceivers 226-1 to 226-N (e.g., one for each antenna). The transmit processor 224 may perform spatial processing on the incoming frames and provide a plurality of transmit frame streams for the plurality of antennas. The transceivers 226-1 to 226-N receive and process (e.g., convert to analog, amplify, filter, and frequency upconvert) the respective transmit frame streams to generate transmit signals for transmission via the antennas 230-1 to 230-N.

For transmitting data, the access terminal 220 comprises a transmit data processor 260, a frame builder 262, a transmit processor 264, a plurality of transceivers 266-1 to 266-N, and a plurality of antennas 270-1 to 270-N. The access terminal 220 may transmit data to the access point 210 on the uplink, and/or transmit data to another access terminal (e.g., for peer-to-peer communication). The access terminal 220 also comprises a controller 274 configured to control operations of the access terminal 220, as discussed further below.

In operation, the transmit data processor 260 receives data (e.g., data bits) from a data source 255, and processes (e.g., encodes and modulates) the data for transmission. The transmit data processor 260 may support different MCSs. For example, the transmit data processor 260 may encode the data (e.g., using LDPC encoding) at any one of a plurality of different coding rates, and modulate the encoded data using any one of a plurality of different modulation schemes, including, but not limited to, BPSK, QPSK, 16QAM, 64QAM, 64APSK, 128APSK, 256QAM, and 256APSK. In certain aspects, the controller 274 may send a command to the transmit data processor 260 specifying which MCS to use (e.g., based on channel conditions of the uplink), and the transmit data processor 260 may encode and modulate data from the data source 255 according to the specified MCS. It is to be appreciated that the transmit data processor 260 may perform additional processing on the data. The transmit data processor 260 outputs the data symbols to the frame builder 262.

The frame builder 262 constructs a frame, and inserts the received data symbols into a data payload of the frame. Exemplary frame structures or formats are discussed further below. The frame builder 262 outputs the frame to the transmit processor 264. The transmit processor 264 processes the frame for transmission. For example, the transmit processor 264 may support different transmission modes such as an OFDM transmission mode and an SC transmission mode. In this example, the controller 274 may send a command to the transmit processor 264 specifying which transmission mode to use, and the transmit processor 264 may process the frame for transmission according to the specified transmission mode.

In certain aspects, the transmit processor 264 may support multiple-output-multiple-input (MIMO) transmission. In these aspects, the access terminal 220 includes multiple antennas 270-1 to 270-N and multiple transceivers 266-1 to 266-N (e.g., one for each antenna). The transmit processor 264 may perform spatial processing on the incoming frame and provide a plurality of transmit frame streams for the plurality of antennas. The transceivers 266-1 to 266-N receive and process (e.g., convert to analog, amplify, filter, and frequency upconvert) the respective transmit frame streams to generate transmit signals for transmission via the antennas 270-1 to 270-N.

For receiving data, the access point 210 comprises a receive processor 242, and a receive data processor 244. In operation, the transceivers 226-1 to 226-N receive signals (e.g., from the access terminal 220) via the antennas 230-1 to 230-N, and process (e.g., frequency downconvert, amplify, filter and convert to digital) the received signals.

The receive processor 242 receives the outputs of the transceivers 226-1 to 226-N, and processes the outputs to recover data symbols. For example, the access point 210 may receive data (e.g., from the access terminal 220) in a frame. In this example, the receive processor 242 may detect the start of the frame using the STF sequence in the preamble of the frame. The receive processor 242 may also use the STF for automatic gain control (AGC) adjustment. The receive processor 242 may also perform channel estimation (e.g., using the CEF in the preamble of the frame) and perform channel equalization on the received signal based on the channel estimation.

The receive processor 242 may also recover information (e.g., MCS scheme) from the header of the frame, and send the information to the controller 234. After performing channel equalization, the receive processor 242 may recover data symbols from the frame, and output the recovered data symbols to the receive data processor 244 for further processing. It is to be appreciated that the receive processor 242 may perform other processing.

The receive data processor 244 receives the data symbols from the receive processor 242 and an indication of the corresponding MCS scheme from the controller 234. The receive data processor 244 demodulates and decodes the data symbols to recover the data according to the indicated MCS scheme, and outputs the recovered data (e.g., data bits) to a data sink 246 for storage and/or further processing.

As discussed above, the access terminal 220 may transmit data using an OFDM transmission mode or a SC transmission mode. In this case, the receive processor 242 may process the receive signal according to the selected transmission mode. Also, as discussed above, the transmit processor 264 may support multiple-output-multiple-input (MIMO) transmission. In this case, the access point 210 includes multiple antennas 230-1 to 230-N and multiple transceivers 226-1 to 226-N (e.g., one for each antenna). Each transceiver receives and processes (e.g., frequency downconverts, amplifies, filters, and converts to digital) the signal from the respective antenna. The receive processor 242 may perform spatial processing on the outputs of the transceivers 226-1 to 226-N to recover the data symbols.

For receiving data, the access terminal 220 comprises a receive processor 282, and a receive data processor 284. In operation, the transceivers 266-1 to 266-N receive signals (e.g., from the access point 210 or another access terminal) via the antennas 270-1 to 270-3, and process (e.g., frequency downconvert, amplify, filter and convert to digital) the received signals.

The receive processor 282 receives the output of the transceiver 266, and processes the output to recover data symbols. For example, the access terminal 220 may receive data (e.g., from the access point 210 or another access terminal) in a frame, as discussed above. In this example, the receive processor 282 may detect the start of the frame using the STF sequence in the preamble of the frame. The receive processor 282 may also perform channel estimation (e.g., using the CEF in the preamble of the frame) and perform channel equalization on the received signal based on the channel estimation.

The receive processor 282 may also recover information (e.g., MCS scheme) from the header of the frame, and send the information to the controller 274. After performing channel equalization, the receive processor 282 may recover data symbols from the frame, and output the recovered data symbols to the receive data processor 284 for further processing. It is to be appreciated that the receive processor 282 may perform other processing.

The receive data processor 284 receives the data symbols from the receive processor 282 and an indication of the corresponding MCS scheme from the controller 274. The receive data processor 284 demodulates and decodes the data symbols to recover the data according to the indicated MCS scheme, and outputs the recovered data (e.g., data bits) to a data sink 286 for storage and/or further processing.

As discussed above, the access point 210 or another access terminal may transmit data using an OFDM transmission mode or a SC transmission mode. In this case, the receive processor 282 may process the receive signal according to the selected transmission mode. Also, as discussed above, the transmit processor 224 may support multiple-output-multiple-input (MIMO) transmission. In this case, the access terminal 220 includes multiple antennas 270-1 to 270-N and multiple transceivers 266-1 to 266-N (e.g., one for each antenna). Each transceiver receives and processes (e.g., frequency downconverts, amplifies, filters, and converts to digital) the signal from the respective antenna. The receive processor 282 may perform spatial processing on the outputs of the transceivers 266-1 to 266-N to recover the data symbols.

As shown in FIG. 2, the access point 210 also comprises a memory 236 coupled to the controller 234. The memory 236 may store instructions that, when executed by the controller 234, cause the controller 234 to perform one or more of the operations described herein. Similarly, the access terminal 220 also comprises a memory 276 coupled to the controller 274. The memory 276 may store instructions that, when executed by the controller 274, cause the controller 274 to perform the one or more of the operations described herein.

Frame Format Common to the Enhanced Frames

FIG. 3A illustrates an exemplary frame or frame portion 300 in accordance with another aspect of the disclosure. As described herein, all of the suggested frame formats include legacy fields: L-STF+L-CEF+L-Header. After the legacy fields, the transmission includes various fields that are part of the new 802.11ay protocol or formats. According to the new protocol, several transmission options may be used: orthogonal frequency division multiplexing (OFDM), single carrier wideband (SC WB), single carrier (SC) Aggregate, and each one has various options and formats. All the aforementioned 802.11ay options include an EDMG Header with optional data.

As shown, according to the new frame or frame portion 300, the L-STF may have a duration of substantially 1.16 microseconds (u s), the L-CEF may have a duration of substantially 0.73 µs, the L-Header may have a duration of substantially 0.58 µs, and the EDMG Header may have a duration of substantially 0.29 µs or an integer K multiple thereof. In the case that the frame 300 is a full frame (not a frame portion), the frame 300 may be transmitted via a single channel and include data payload in the EDMG Header. Such configuration may be useful for short messages because there is no need for a separate data payload according to the new frame format, which may consume overhead for the transmission.

The L-Header specifies various parameters and it is decoded by all stations (user devices and access points) that are in range. These stations listen when they are waiting for receiving a message or prior to transmission. The L-Header specifies the modulation coding scheme (MCS) used in the legacy data transmission and the amount of data that is transmitted. Stations use these two values to compute the duration length to update the network allocation vector (NAV). This is a mechanism that allows stations to know that the medium is going to be used by a transmitter, even if they cannot decode the data itself, or even if they are not the intended receiver of the message. The use of NAV is one of the mechanisms to avoid transmitted signal collisions.

In the legacy 802.11ad frame format (for data), data is placed in low density parity check (LDPC) blocks, where the size is according to the code rate, then encoded to a fixed length (672 bits). The outcome is concatenated and then split into Fast Fourier Transform (FFT) blocks according to the selected MCS (mainly modulation). At a receiver, the process is reversed. It should be noted that in low data MCSs, one LDPC block may require one or more FFT blocks, while in high data MCSs, one FFT block may host more than one LDPC blocks. This discussion is relevant to the placing of LDPC data immediately after the EDMG Header, as described in more detail herein.

FIG. 3B illustrates an exemplary EDMG Header 350 of the frame or frame portion 300 in accordance with certain aspects of the present disclosure. The EDMG Header 350 specifies the transmission frame parameters (MCS, Data length, modes, etc.) that are used by a receiver to be able to receive and decode the transmission frame. There is no need for other stations (not the destination station) to demodulate the EDMG Header 350. Hence, the EDMG Header 350 and optional attached data can be transmitted at high MCS, that is suitable for the destination station.

The EDMG Header 350 comprises: (1) a Payload data Length field including 24 bits to specify the length of the new protocol 802.11ay payload data in octets in all concurrent channels, regardless of whether the payload data is appended to the EDMG Header 350 or in the separate payload portion; (2) an EDMG Header Number of LDPC blocks field including 10 bits to specify the number of LDPC data blocks in the EDMG Header and data. When this value is zero (0), it means there is one (1) LDPC block of data in the EDMG Header; (3) a Spatial streams field including 4 bits to represent the number (e.g., 1 to 16) of spatial streams that are transmitted; (4) a Channels field including 3 bits to specify the number of bonded channels (e.g., 1 to 8 802.11ad channels, as well as additional channels not available in 802.11ad); and (5) a Channel offset field including 3 bits to specify the offset of the first channel of the bonded channels. In this example, the first channel is the left-most (lowest frequency) channel among the bonded channels. This value is set to zero (0) when the first channel is the lowest frequency channel among all the available channels, or when only one channel is used (i.e., no channel bonding).

The EDMG Header 350 further comprises: (6) an 11ay MCS field including 6 bits to specify the MCS used in the NG60 (802.11ay) payload transmission (commonly referred to as EDMG payload). Note that the short data attached to EDMG Header uses the legacy 802.11ad MCS. The 802.11ay MCS may include higher throughput modulation schemes beyond those available in 802.11ad, such as 64QAM, 64APSK, 256QAM, and 256 APSK; (7) a GI (Guard Interval) mode field including one bit to indicate short or long GI. Note that the actual values may be dependent on parameters, such as the number of bonded channels; (8) an FFT mode field including one bit to indicate short or long FFT block. Note that the actual values may be dependent on parameters, such as the number of bonded channels; and (9) an LDPC mode field including 1 bit to indicate short or long LDPC block.

The EDMG Header 350 further comprises: (10) a Power difference field including 4 bits to signal a difference in average power between the aggregated power of the legacy portion and EDMG Header of the new frame (e.g., L-STF+ L-CEF+L-Header+EDMG Header/Data) and the SC WB mode transmission of the EDMG (802.11ay) part (optional EDMG STF+optional EDMG CEF+EDMG Payload). This difference may be vendor specific. Some transmitters may need power backoff between the aggregated section and the WB section due to PA non-linearity. This value informs the receiver about the expected power difference to assist in AGC setup. The value is coded in dB (e.g., 0000:0 dB, 0100:4 dB, 1111:15 dB or above).

The EDMG Header 350 further comprises: (11) Reserved bits, that is, 23 bits that are reserved at this time. Transmitters should set them to 0 at this time. In the future, these bits may be allocated to various needs; (12) Proprietary bits, that is, 8 spare bits that may be used by vendors and do not require interoperability. Receivers should discard these bits unless they know what they are; and (13) a CRC field including 16 bits to sign the EDMG Header. This field is to be used by a receiver to validate the correctness of the received EDMG Header. All bits (except the CRC) shall be used to compute the CRC.

The EDMG Header 350 may be sent on each concurrently-transmitted channel with exactly the same content. This duplication may be used by a receiver to increase the correct detection probability. A receiver may use different algorithms: Option1: receiver decodes only one channel (simples but lowest performance); Option2: receiver decodes only one channel at the time. If CRC passes, then the receiver may cease CRC processing for additional channel(s), if it has not attempted CRC processing for additional channel(s). Option 2 may be better at performance than Option 1, but requires serial processing; and Option 3: receiver decodes all channels and selects one that has the corrected CRC. Option 3 may have the same performance as Option 2, but is faster.

Data Attached to the EDMG Header

Receivers, according to the new protocol EDMG (802.11ay), need, from a practical aspect, decode the EDMG Header before samples for the optional EDMG STF, optional EDMG CEF, and EDMG data payload can be received. The reason is that the receiver may need to perform some adjustments. For instance, in SC WB transmission mode, the optional EDMG STF is transmitted in single carrier wideband (SC WB) mode and the receiver front-end needs to be re-configured with new filters and other parameters. The use of the 802.11ay modulations require some overhead to be used in some cases (e.g., for processing the optional EDMG STF and/or optional EDMG CEF). This overhead reduces the efficiency especially in short messages.

Efficient support of the above lead us to suggest to: (1) Use the "spare" period following the EDMG Header to start to transmit the data; (2) Extend the data following the EDMG Header to at least 2 LDPC blocks and 2 FFT blocks before modulation is changed to 11ay set (including the optional EDMG STF and/or EDMG CEF); and optionally extend the data following the EDMG Header beyond the minimum (specified above) for improving efficiency for short payloads.

EDMG Header may be sent on each 60 GHz channel used for any transmission, using the legacy 802.11ad MCS specified in the L-Header. The EDMG Header may be followed by data (if data is to be sent). The data following the EDMG Header may be split over all used channels.

If 802.11ay modulations are used in the transmission, then the EDMG Header and attached data should occupy at least two FFT blocks and at least two LDPC blocks (all this is using the legacy MCS). All LDPC blocks may be fully populated in the EDMG Header. Transmitter may extend this portion to more LDPC blocks, up to 1024 blocks (per channel, all channels use same legacy MCS). The Length of the data attached to the EDMG Header is according to the number of LDPC blocks (specified in the EDMG Header Number of LDPC blocks field in the EDMG Header per channel) multiplied by number of channels, and amount of bits per LDPC blocks. The length of data in the EDMG payload field is the rest of the data according to the Length specified in the EDMG Header.

If 802.11ay modulation is not used in the transmission (e.g., in a short message application), then the EDMG Header and attached data (if data is to be sent) should occupy at least one FFT block and at least one LDPC block (all this using the legacy MCS). The data should fill the LDPC blocks starting from lowest channel index (e.g., the LDPC block of the lowest-frequency channel is filled first, then the LDPC block of the second lowest-frequency channel is filled, and so on). The Length specified in the EDMG Header refers to the actual data that is transmitted following the EDMG Header when no 802.11ay modulation is used.

The transmitter may select more numbers of LDPC blocks in order to optimize the transmission for short packets (avoiding the 802.11ay optional sections STF and CEF overhead). Receiver should compare the data length from these LDPC blocks with the Data Length in the EDMG Header to deduce if there is a 802.11ay section at all and if yes, to compute the exact amount of data in the 802.11ay payload section alone. Note that the LDPC blocks including the EDMG Header and data are fully populated with data if the EDMG data payload exists.

The FFT block(s) and LDPC block(s) are per channel. The payload data following the EDMG Header is split between the channels evenly starting from lowest channel in a round-robin manner per byte. If the data cannot be confined in the portion attached to the EDMG Header, then this portion will be completely filled before data is sent via 802.11ay payload section. The data length in the EDMG Header specifies the actual number of octets, regardless of where they are located.

The following provides a few non-limiting examples regarding the amount of data available in the data section attached to the EDMG Header for 2 LDPC blocks or 2 FFT blocks:

Case1: 1 channel & legacy MCS-1 (this is the case of the least data). In MCS-1, two LDPC blocks may be used. These two blocks host 336 bits and will take three FFT blocks to be transmitted. In this example, the information fields in the EDMG Header occupy 104 bits. Thus, the payload data attached to the EDMG Header is 232 bits (29 bytes) (i.e., 336 bits-104 bits).

Case 2: 4 channels and legacy MCS-12 (this is the case of the most data). In MCS-12, two FFT blocks host 3584 coded bits per channel, that can host 5 LDPC blocks. At this code rate, there are 2520 bits in the 5 LDPC blocks, out of which 104 field bits will be used for EDMG Header. This leaves 2416 bits for payload data in the EDMG Header per channel. Hence, in this case, a total of 1214 payload bytes of data may be transmitted via the EDMG Header of the 4 channels.

Case 3: 2 channels and legacy MCS-8 (an intermediate data amount case). In MCS-8, two FFT blocks host 1792 coded bits per channel, that can hold 2 LDPC blocks. In the two LDPC blocks, there are 1008 bits, out of which 104 are dedicated to the information fields of the EDMG Header. This leaves a total of 904 bits for payload data in the EDMG Header of each channel. For the two channel case, a total of 228 bytes of payload data in the EDMG Headers may be transmitted.

L-Header Change to Indicate Transmission Mode

Bits 44 to 46, which are reserved bits in the 802.11ad header, may be used in the L-Header portion of the new protocol 802.11ay frame to signal transmission mode for the 802.11ay new protocol. For example, the L-Header indicates this as a 802.11ay mode by setting three (3) bits to any value other than all zeros. Example of the bits value and corresponding modes are indicated in the following table:

| Bits | Mode |
|---|---|
| 000 | 802.11ad (legacy mode) |
| 001 | SC-WB |
| 010 | SC-Aggregate |
| 011 | SC-Duplicate |
| 100 | OFDM |
| Other | Reserved |

Frame Format for OFDM with L-CEF and CEF-GF Transmitted Simultaneously

FIGS. 4A-4D illustrate exemplary frames 400, 420, 440, and 460 for transmission via an orthogonal frequency division multiplexing (OFDM) transmission mode in accordance with an aspect of the disclosure. The OFDM frame format is configured to maintain the legacy 802.11ad preamble (L-STF and L-CEF) and L-Header as prefix in order to be backwards compliant. In addition, OFDM frames may be transmitted with some backoff to reduce peak to average power ratio (PARP), which needs to be applied to the legacy preambles themselves. In all of the frame diagrams, the vertical or y-axis represents frequency and the horizontal or x-axis represents time.

Figure 4A:
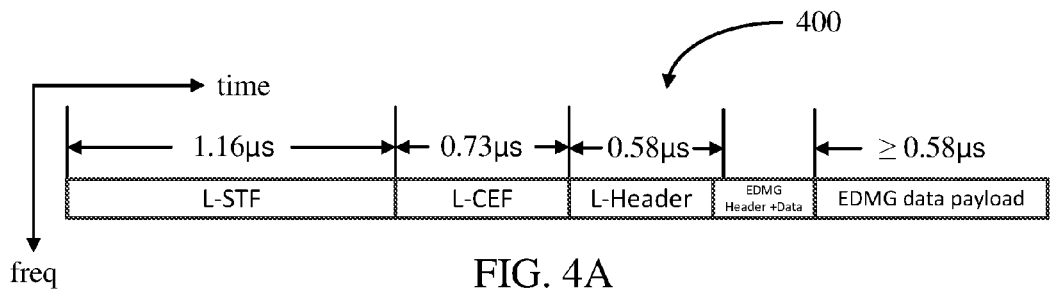
FIGS. 4A-4D illustrate a set of exemplary frames for transmission of data via an orthogonal frequency division multiplexing (OFDM) transmission in accordance with certain aspects of the present disclosure.

More specifically, with reference to FIG. 4A, frame 400 is an example of a single-channel OFDM frame including an L-STF, an L-CEF, an L-Header, an EDMG Header with optional attached data, and an EDMG (802.11ay) data payload. The bandwidth of the single-channel may be substantially 1.76 GHz. As previously discussed, the duration or length of the L-STF, L-CEF, L-Header, and EDMG Header with optional attached data may be substantially 1.16 µs, 0.73 µs, 0.58 µs, and ≥0.58 µs, such as an integer K multiple of 0.58 µs. As illustrated, the L-STF, L-CEF, L-Header, EDMG Header, and EDMG data payload may be transmitted in such order without time gaps between each of the frame portions.

Figure 4B:
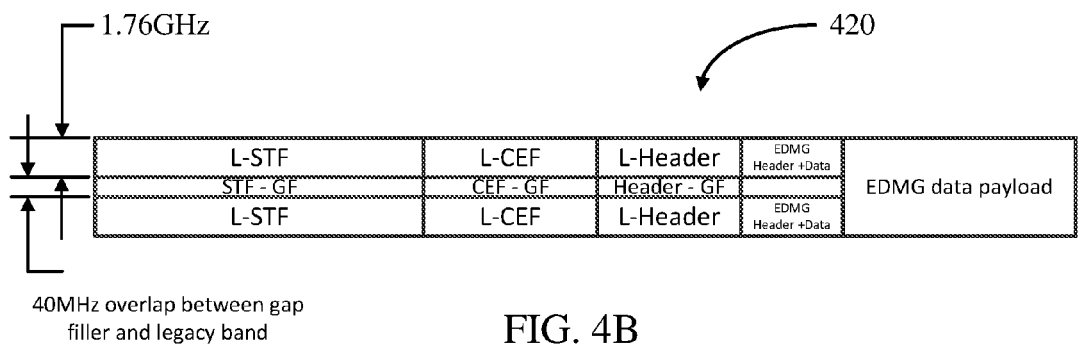
Figure 4C:
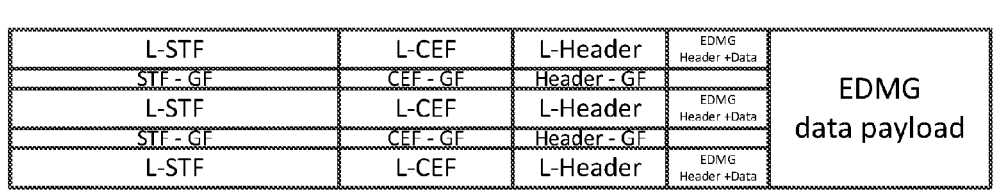
Figure 4D:
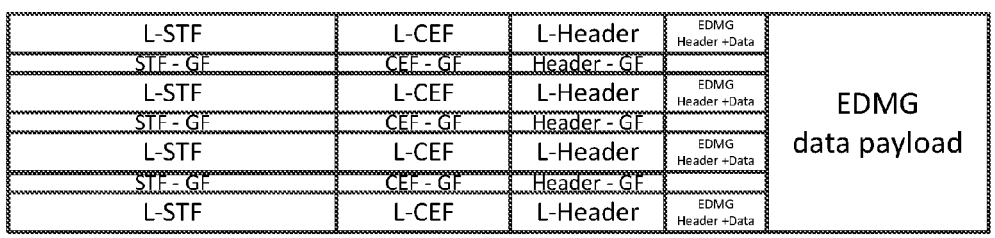

With reference to FIG. 4B, frame 420 is an example of a two bonded channel OFDM frame in accordance with the new protocol (802.11ay). The frame 420 comprises a first (lower frequency) channel (upper channel as shown) for transmitting the legacy preamble (L-STF and L-CEF), the L-Header, and the EDMG Header with the optional attached data. The first channel may have a bandwidth of substantially 1.76 GHz. The frame 420 further comprises a second (lower frequency) channel (lower channel as shown) for transmitting the legacy preamble (L-STF and L-CEF), L-Header, and the EDMG Header. The transmission of the L-STF, L-CEF, and L-Header in the first and second channels are for 802.11ad backward compatibility. The data attached to the EDMG Header for the first channel may be different than the data attached to the EDMG Header of the second channel. The second channel also has a bandwidth of substantially 1.76 GHz. The first channel includes a frequency band that is spaced apart in frequency from the frequency band of the second channel.

Additionally, the frame 420 comprises a gap filling (GF) channel having a frequency band situated in frequency between the first and second frequency bands of the first and second channels. In other words, the first and second frequency bands are separated by a gap, and the GF channel is situated in the gap separating the first and second frequency bands. The GF channel may have a bandwidth of substantially 440 MHz (0.44 GHz). Since the total bandwidth for the transmission is 3.92 GHz, the high frequency portion of the first channel may overlap with the low frequency portion of the GF channel by 20 MHz. Similarly, the high frequency portion of the GF channel may overlap with the low frequency portion of the second channel by 20 MHz. However, as discussed in more detail below, a channel estimation field portion of the GF channel may be narrowed by filtering to substantially minimize the overlap between the first channel and the GF channel, and between the second channel and the GF channel.

The GF channel comprises a short training field (STF-GF), a channel estimation field (CEF-GF), and an optional header (Header-GF). The L-STF of the first channel, the STF-GF of the GF channel, and the L-STF of the second channel are transmitted in a substantially time aligned manner. That is, the first channel L-STF, the STF-GF, and the second channel L-STF may have substantially the same length or duration, and they are transmitted at substantially the same time. In other words, the transmission of the beginning and end of the first channel L-STF, the STF-GF, and the second channel L-STF are substantially time aligned. The STF-GF may be also based on Golay sequences, and may be also configured substantially the same or similar to the Golay sequences of the first and second channel L-STF. The L-STF of the first and second channels and the STF-GF of the GF channel may be used collectively by a receiver for AGC (power) adjustment and/or other purposes.

Similarly, the L-CEF of the first channel, the CEF-GF of the GF channel, and the L-CEF of the second channel are transmitted in a substantially time aligned manner. That is, the first channel L-CEF, the CEF-GF, and the second channel L-CEF may have substantially the same length or duration, and they are transmitted at substantially the same time. In other words, the transmission of the beginning and end of the first channel L-CEF, the CEF-GF, and the second channel L-CEF are substantially time aligned.

The CEF-GF may be also based on Golay sequences. The sequences may also be modulated using BPSK modulation, as it is done in the L-CEF in accordance with 802.11ad. There may be three (3) options for implementing the CEF-GF based on Golay sequences. A first option is for the CEF-GF to be based on Golay sequences, each having a length of 32 symbols. For example, the sequences may be the same as the sequences defined in the 802.11ad standard, Table 21-28, reproduced below:

TABLE 21-28

The sequence Ga32(n)
The Sequence Ga32(n), to be transmitted from left to right

+1 +1 +1 +1 +1 −1 +1 −1 −1 −1 +1 +1 +1 −1 −1 +1 +1 +1 −1 −1 +1 −1
−1 +1 −1 −1 −1 −1 +1 −1 +1 −1

A second option is for the CEF-GF to be based on Golay sequences, each having a length of 20 symbols. There are various options for building Golay sequences of length 20. For instance, Golay sequences of length 20 may be built from the following seeds of length 10:
Seed "a": [+1+1−1+1−1+1+1−1−1+1+1] and Seed "b": [+1+1−1+1+1+1+1+1−1−1−1]; or
Seed "a": [+1+1+1+1+1−1+1−1−1+1] and Seed "b": [+1+1−1+1+1+1+1−1+1−1]
The seeds may be turned into Golay sequence of length 20 using an [a,b] or [a, −b] construction. Alternatively, the Golay sequences may be based on a Golay sequence of length 20 as follows:

Golay 20: [+1+1+1+1−1+1−1−1−1+1+1−1−1+1+1−1+1−1−1+1]; or Golay 20: [+1+1+1+1−1+1+1+1+1+1−1−1−1+1−1+1−1+1+1−1]

A third option is for the CEF-GF to be based on Golay sequences, each having a length of 26 symbols. For example, the following may be an example of a Golay sequence of length 26:
Golay 26: [+1+1+1+1−1+1+1−1−1+1−1+1−1+1−1−1+1−1+1+1−1−1+1+1+1]; or
Golay 26: [+1+1+1+1−1+1+1−1−1+1−1+1+1+1+1+1−1+1−1−1−1+1+1−1−1−1]

A receiver may use the L-CEF, CEF-GF, and L-CEF collectively to determine a channel estimation for the frequency ranges associated with the first and second channels and the GF channel. Or, in other words, since the EDMG payload is transmitted via a bonded channel having a frequency range that overlaps with or has the substantially the same frequency range as the combined frequency ranges of the first channel, GF channel, and second channel, a receiver may use the L-CEF, CEF-GF, and L-CEF collectively to determine a channel estimation for decoding the data in the EDMG payload.

In order for a receiver to accurately determine channel estimation for the frequency ranges associated with the first channel, GF channel, and second channel, it is desirable that there be minimal overlap in frequency between the first channel and the GF channel, and the second channel and the GF channel. To effectuate such minimal overlap, shaping filters for the first channel L-CEF, CEF-GF, and second channel L-CEF may be implemented with sharp rejection skirts to allow the receiver to estimate correctly the channel for the first channel, GF channel, and second channel. As an example, the shaping filters may be configured such that overlap between the frequency ranges of both L-CEF and CEF-GF, respectively, may occur at substantially 7 dB or more below the passband of the frequency ranges. The passband of the shaping filters should be has flat as possible given design constraints (e.g., ripple<1 dB). As an example, one or more of the shaping filter may be implemented as a Kaiser window based filter with over 200 taps in order to achieve the desired out-of-band rejection and passband flatness. The filter output may be implemented with pre-computed signal to avoid hardware impact.

The shaping filters may be implemented in interpolation devices. In order to avoid highly complex filters for non-simple ratios, the interpolation devices may use integer or integer multiple of 0.5 for up-sampling an input CEF-GF (e.g., Golay) sequence. The up-sampling is performed in order to achieve a bandwidth for the CEF-GF (e.g., Golay) sequence of substantially 400 megahertz (MHz) so that the sequence signal fills up the GF channel between the first and second channels, and a delay spread for cross-correlation of substantially 0.73 μs. As such, the CEF-GF will have substantially the same delay spread (e.g., substantially 0.73 μs) as the L-CEF.

As an example, the interpolation device may perform up-sampling with ratios between 12-18 for a frame having two (2) bonded channels to achieve the 400 MHz bandwidth and 73 μs delay spread for input Golay sequences based on lengths 32, 26 and 20, as previously discussed. As another example, the interpolation device may perform up-sampling with ratios between 17-32 for a frame having three (3) bonded channels to achieve the 400 MHz bandwidth and 73 μs delay spread for input Golay sequences based on lengths 32, 26 and 20, as previously discussed. As a further example, the interpolation device may perform up-sampling with ratios between 23-40 for a frame having four (4) bonded channels to achieve the 400 MHz bandwidth and 73 μs delay spread for input Golay sequences based on lengths 32, 26 and 20, as previously discussed.

The remainder of the frame 420 includes the L-Headers transmitted via the first and second channels following the L-CEF sequences of the first and second channels, respectively. The GF channel may also include a Header-GF transmitted via the GF channel following the CEF-GF. The Header-GF may be optionally transmitted in order to provide additional information beyond the information provided in the L-Header. The L-Headers for the first and second channels, and the Header-GF have substantially the same lengths and are transmitted in a substantially time aligned manner (e.g., the transmission of the beginning and ending of the headers occur at substantially the same time).

Additionally, the frame 420 includes the EDMG Header and optional attached data transmitted via the first and second channels following the corresponding L-Headers. The EDMG Headers for the first and second channels have the substantially same lengths and are transmitted in a substantially time aligned manner (e.g., the transmission of the beginning and ending of the EDMG Headers occur at substantially the same time).

As illustrated, the frame 420 includes the EDMG (802.11ay) data payload transmitted via a bonded channel following the EDMG Headers of the first and second channels. Frame 420 is an example of a channel bonding of two as the frequency band of the bonded channel overlaps with the frequency bands of the first and second channels of the frame 420. Or, alternatively, the lower and upper ends of the frequency band of the bonded channel substantially align in frequency with the lower end of the frequency band of the first channel and the upper end of the frequency band of the second channel, respectively. Since the frequency band of the bonded channel also encompasses the frequency band of the GF channel, the L-CEF of the first and second channels and the CEF-GF of the GF channel are collected by a receiver to determine or generate a channel estimation for the frequency range of the bonded channel to facilitate the receiver decoding the data payload transmitted via the bonded channel.

As previously discussed, the transmission of the L-Header and EDMG Header are transmitted using MCS specified in the legacy 802.11ad protocol. The data in the separate new protocol (802.11ay) payload is transmitted using one of the MCS specified in the new protocol 802.11ay. Since the new protocol includes additional MCS beyond those specified in the legacy 802.11ad, the EDMG data payload may be transmitted using an MCS different than the MCS used to transmit the L-Header and EDMG Header. However, it shall be understood that the MCS used for transmitting the EDMG data payload may be the same as the MCS used for transmitting the L-Header and EDMG Header, as the 802.11ay may include the same MCS specified in the legacy 802.11ad.

Frame 440 is an example of an OFDM frame with a channel bonding of three. Frame 440 is similar to the OFDM frame 420 with a channel bonding of two, but includes an additional third channel and an additional second GF channel situated in frequency between the second and third channels. The EDMG data payload is transmitted by way of a bonded channel having a frequency band that overlaps with the frequency bands of the first channel, first GF channel, second channel, second GF channel, and third channel. Or, alternatively, the lower and upper ends of the frequency band of the bonded channel substantially align in frequency with the lower end of the frequency band of the first channel and the upper end of the frequency band of the third channel, respectively. A receiver may collect the L-CEF of the first, second, and third channels, and the CEF-GF of the first and second GF channels to determine or generate a channel estimation for the frequency range of the bonded channel to facilitate the decoding of the data payload transmitted via the bonded channel.

Frame 460 is an example of an OFDM frame with a channel bonding of four. Frame 460 is similar to OFDM frame 440 with a channel bonding of three, but includes an additional fourth channel and an additional third GF channel situated in frequency between the third and fourth channels. The EDMG data payload is transmitted by way of a bonded channel having a frequency band that overlaps with the frequency bands of the first channel, first GF channel, second channel, second GF channel, third channel, third GF channel, and fourth channel. Or, alternatively, the lower and upper ends of the frequency band of the bonded channel substantially align in frequency with the lower end of the frequency band of the first channel and the upper end of the frequency band of the fourth channel, respectively. Similarly, a receiver may collect the L-CEF of the first, second, third, and fourth channels, and the CEF-GF of the first, second, and third GF channels to determine or generate a channel estimation for the frequency range of the bonded channel to facilitate the decoding of the data payload transmitted via the bonded channel.

The EDMG Header for the OFDM frames 400, 420, 440, and 460 is format-wise essentially the same as the EDMG Header 350 previously discussed, except that the Power difference field bits are indicated as reserved bits. This is because OFDM frames may be transmitted with a substantially uniform average power throughout the duration of the frame.

Although frames 420, 440, and 460 are examples of frames with channel bonding of two, three, and four, respectively, it shall be understood that a frame may be configured in a similar manner to provide more an OFDM frame with channel bonding of more than four.

Frame Format for OFDM with L-Header and CEF-GF Transmitted at the Same Time

Figure 5A:
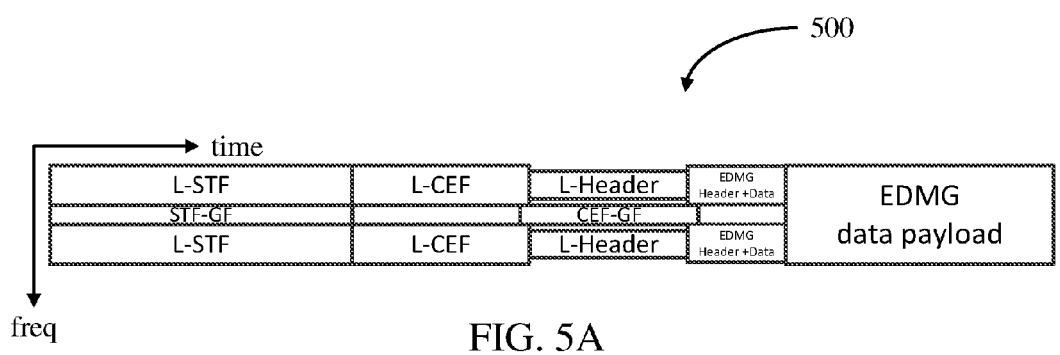
FIGS. 5A-5C illustrate another set of exemplary frames for transmission of data via an orthogonal frequency division multiplexing (OFDM) transmission in accordance with certain aspects of the present disclosure.
Figure 5B:
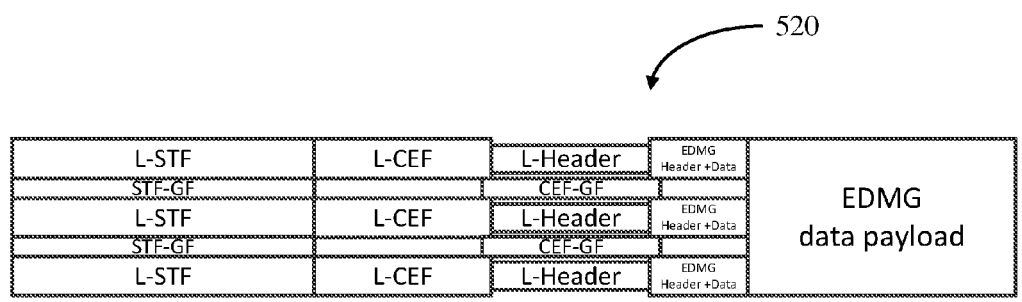
Figure 5C:
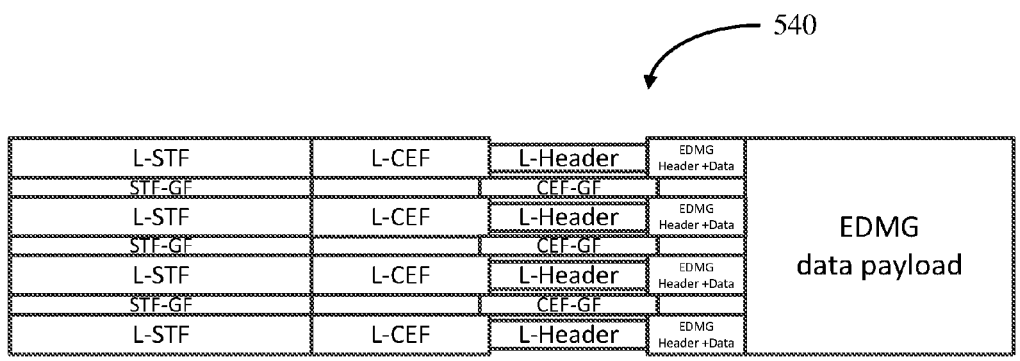

FIGS. 5A-5C illustrate exemplary frames 500, 520, and 540 for transmission of data payload via two, three, and four bonded channels by way of an OFDM transmission in accordance with another aspect of the disclosure. In summary, the CEF-GF of one or more gap filling (GF) channels are transmitted at the same as the L-Headers of two or more channels in each of the frames 500, 520, and 540.

Considering the OFDM frame 500 with a channel bonding of two, the frame includes a first (lower frequency) channel for transmission of an L-STF, L-CEF, L-Header, and EDMG Header with optional attached data. The frame 500 further comprises a second (upper frequency) channel for transmission of another L-STF, L-CEF e, L-Header, and EDMG Header with optional attached data. The L-STF, L-CEF, L-Header, and EDMG Header of the first and second channels have substantially the same transmission lengths and are transmitted in a substantially time aligned manner. The first channel is associated with a first frequency band and the second channel is associated with a second frequency band different or spaced apart from the first frequency band. The first and second frequency bands each have a bandwidth of substantially 1.76 GHz.

The frame 500 further comprises a gap filling (GF) channel including a frequency band situated between the respective frequency bands of the first and second channels. The bandwidth of the GF channel may be 440 MHz, wherein 20 MHz of a lower end of the GF channel may overlap (during some portion of the frame) with 20 of the upper end of the first channel, and 20 MHz of the upper end of the GF channel may overlap (during some portion of the frame) with 20 MHz of a lower end of the second channel. The frame 500 includes, for transmission via the GF channel, an STF-GF having substantially the same transmission length or duration as the L-STF of the first and second channels, and configured for transmission in a substantially time aligned manner as the L-STF of the first and second channels. A receiver may receive the L-STF of the first and second channels and the STF-GF of the GF channel to perform AGC (power) adjustment and/or other purposes for receiving the rest of the frame.

The frame 500 further comprises a CEF-GF for transmission via the GF channel. The CEF-GF may be based on a Golay sequence. For example, the CEF-GF may be based on Golay sequences, each having a length of 32 symbols as specified in 802.11ad, Table 21-18, previously discussed with reference to frames 420, 440, and 460. The frame 500 is configured such that a portion of the CEF-GF is transmitted at the same time as a portion of the L-Headers of the first and second channels. More specifically, or alternatively, since the CEF-GF has a length of substantially 0.73 µs, and the L-Headers each have a length of substantially 0.58 µs, the frame 500 may be configured such that the transmission of the CEF-GF begins slightly before the transmission of the L-Headers begins, and ends after the transmission of the L-Headers has ended.

To ease the filter requirement for the CEF-GF transmission, the L-Header transmissions may be narrowed in the frequency domain by passing the signal via a narrowing filter (or any similar method) in order to set small frequency gaps between the L-Headers and the CEF-GF, respectively. Exemplary frequency spectrum of the L-Header and CEF-GF transmissions are discussed further herein with reference to FIGS. 15F-15G.

The frame 500 further comprises an EDMG (802.11ay) data payload for transmission via a bonded channel. The transmission of the data payload follows the transmission of the EDMG Headers of the first and second channel. The bonded channel has a frequency band that overlaps with the frequency bands of the first and second channels, and the GF channel. More specifically, or alternatively, a lower end of the frequency band of the bonded channel substantially coincides in frequency with a lower end of the frequency band of the first channel, and an upper end of the frequency band of the bonded channel substantially coincides in frequency with an upper end of the frequency band of the second channel.

Since the frequency band of the bonded channel overlaps or substantially coincides with the combined frequency ranges of the first channel, GF channel, and second channel, a receiver may collect the L-CEF of the first and second channel, and the CEF-GF of the GF channel to determine or generate a channel estimation for the frequency band of the bonded channel. Because the L-CEF of the first and second channels are transmitted earlier than the CEF-GF, the receiver may need to buffer information associated with the L-CEF in the process of receiving the CEF-GF. The receiver uses the generated channel estimation associated with the bonded channel in order to decode the data payload transmitted via the bonded channel.

Frame 520 is an example of an OFDM frame with a channel bonding of three. Frame 520 is similar to that of OFDM frame 500 with a channel bonding of two, but includes an additional third channel and an additional second GF channel situated in frequency between the second and third channels. The EDMG data payload is transmitted by way of a bonded channel having a frequency band that overlaps with the frequency bands of the first channel, first GF channel, second channel, second GF channel, and third channel. Or, alternatively, the lower and upper ends of the frequency band of the bonded channel substantially align in frequency with the lower end of the frequency band of the first channel and the upper end of the frequency band of the third channel, respectively. A receiver may collect the L-CEF of the first, second, and third channels, and the CEF-GF of the first and second GF channels to determine or generate a channel estimation for the frequency band of the bonded channel to facilitate the decoding of the data payload transmitted via the bonded channel.

Frame 540 is an example of an OFDM frame with a channel bonding of four. Frame 540 is similar to that of OFDM frame 520 with a channel bonding of three, but includes an additional fourth channel and an additional third GF channel situated in frequency between the third and fourth channels. The EDMG data payload is transmitted by way of a bonded channel having a frequency band that overlaps with the frequency bands of the first channel, first GF channel, second channel, second GF channel, third channel, third GF channel, and fourth channel. Or, alternatively, the lower and upper ends of the frequency band of the bonded channel substantially align in frequency with the lower end of the frequency band of the first channel and the upper end of the frequency band of the fourth channel, respectively. Similarly, a receiver may collect the L-CEF of the first, second, third, and fourth channels, and the CEF-GF of the first, second, and third GF channels to determine or generate a channel estimation for the frequency band of the bonded channel to facilitate the decoding of the data payload transmitted via the bonded channel.

Figure 6A:
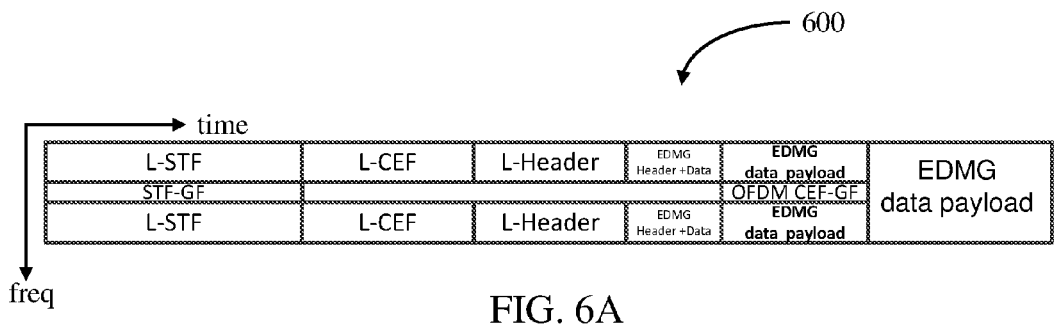
FIGS. 6A-6C illustrate yet another set of exemplary frames for transmission of data via an orthogonal frequency division multiplexing (OFDM) transmission in accordance with certain aspects of the present disclosure.
Figure 6B:
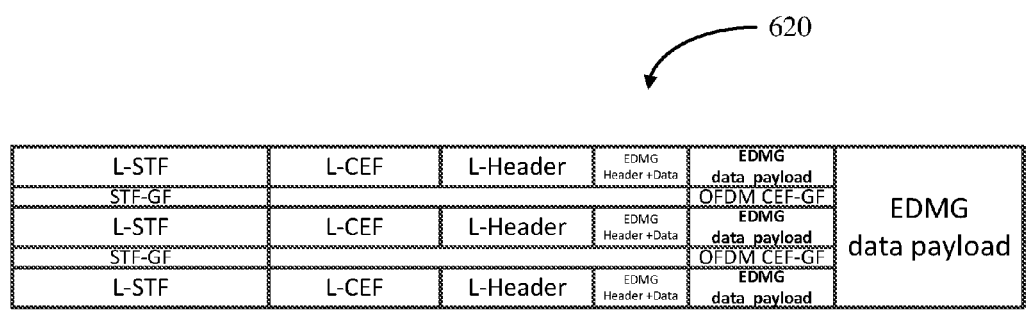
Figure 6C:
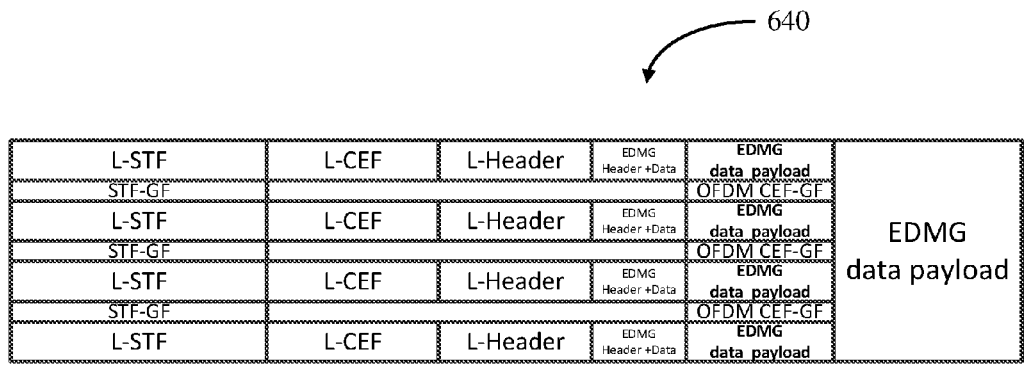

Frame Format for OFDM with CEF-GF Transmitted Simultaneous with Portions of the Data Payload FIGS. 6A-6C illustrate exemplary frames 600, 620, and 640 for transmission of data payload via two, three, and four bonded channels by way of an OFDM transmission in accordance with another aspect of the disclosure. In summary, the CEF-GF of one or more gap filling (GF) channels are transmitted at the same time as portions of the EDMG (802.11ay) data payload in each of the frames 600, 620, and 640.

Considering the OFDM frame 600 with a channel bonding of two, the frame includes a first (lower frequency) channel for transmission of an L-STF, L-CEF, L-Header, EDMG Header with optional attached data, and a portion (e.g., two OFDM symbols) of the EDMG (802.11ay) data payload. The frame 600 further comprises a second channel (upper frequency) for transmission of another L-STF, L-CEF, L-Header, EDMG Header with optional attached data, and another portion (e.g., two OFDM symbols) of the EDMG (802.11ay) data payload. The L-STF, L-CEF, L-Header, EDMG Header, and EDMG data payload portions of the first and second channels have substantially the same transmission lengths and are transmitted in a substantially time aligned manner. The first channel is associated with a first frequency band and the second channel is associated with a second frequency band different or spaced apart from the first frequency band. The first and second frequency bands each have a bandwidth of substantially 1.76 GHz.

The frame 600 further comprises a gap filling (GF) channel including a frequency band situated between the respective frequency bands of the first and second channels. The bandwidth of the GF channel is 440 MHz, wherein 20 MHz of a lower end of the GF channel may overlap with 20 MHz of the upper end of the first channel, and 20 MHz of the upper end of the GF channel may overlap with 20 MHz of a lower end of the second channel. The frame 600 includes, for transmission via the GF channel, an STF-GF having substantially the same transmission length or duration as the L-STF of the first and second channels, and configured for transmission in a substantially time aligned manner as the L-STF of the first and second channels. A receiver may receive the L-STF of the first and second channels and the STF-GF of the GF channel to perform AGC (power) adjustment for receiving the rest of the frame.

The frame 600 further comprises an OFDM CEF-GF for transmission via the GF channel. The OFDM CEF-GF may comprise a pilot (information known to a receiver) transmitted during the portions of the EDMG data payloads transmitted via the first and second channels. For instance, the OFDM CEF-GF may be transmitted simultaneously or in a time aligned manner with two OFDM data symbols of the portions of the EDMG portions of the EDMG data payload transmitted via the first and second channels. The pilot information may be randomized by a given pseudorandom number generator (PRNG) to avoid spectral/time patterns. The frequency width of the GF channel during the transmission of the CEF-GF should be 400 MHz or slightly higher to compensate also for the L-CEF edges so that a more accurate channel estimation may be achieved of the frequency band of the bonded channel. During the transmission of the portions (e.g., first two OFDM symbols) of the EDMG data payload via the first and second channels, data is placed in subcarriers avoiding pilot carriers, and pilots are placed in the designated pilot subcarriers.

The frame 600 further comprises an EDMG (802.11ay) data payload for transmission via a bonded channel. The transmission of the data payload via the bonded channel follows the transmission of the portions of the EDMG data payload transmitted via the first and second channels, and the OFDM CEF-GF transmitted via the GF channel. The bonded channel has a frequency band that overlaps with the frequency bands of the first and second channels, and the GF channel. More specifically, or alternatively, a lower end of the frequency band of the bonded channel substantially coincides in frequency with a lower end of the first channel, and an upper end of the frequency band of the bonded channel substantially coincides in frequency with an upper end of the second channel.

Since the frequency band of the bonded channel overlaps or substantially coincides with the combined frequency bands of the first channel, GF channel, and second channel, a receiver may collect the L-CEF of the first and second channel, and the OFDM CEF-GF of the GF channel to determine or generate a channel estimation for the frequency band of the bonded channel. Because the L-CEF of the first and second channels are transmitted earlier than the OFDM CEF-GF, the receiver may need to buffer information associated with the L-CEF while in process of receiving the OFDM CEF-GF. The receiver uses the generated channel estimation associated with the bonded channel in order to decode the data payload transmitted via the bonded channel.

Frame 620 is an example of an OFDM frame with a channel bonding of three. Frame 620 is similar to that of OFDM frame 600 with a channel bonding of two, but includes an additional third channel and an additional second GF channel situated in frequency between the second and third channels. The EDMG data payload is transmitted by way of a bonded channel having a frequency band that overlaps with the frequency bands of the first channel, first GF channel, second channel, second GF channel, and third channel. Or, alternatively, the lower and upper ends of the frequency band of the bonded channel substantially aligns in frequency with the lower end of the frequency band of the first channel and the upper end of the frequency band of the third channel, respectively. A receiver may collect the L-CEF of the first, second, and third channels, and the OFDM CEF-GF of the first and second GF channels to determine or generate a channel estimation associated with the bonded channel to facilitate the decoding of the data payload transmitted via the bonded channel.

Frame 640 is an example of an OFDM frame with a channel bonding of four. Frame 640 is similar to that of OFDM frame 620 with a channel bonding of three, but includes an additional fourth channel and an additional third GF channel situated in frequency between the third and fourth channels. The EDMG data payload is transmitted by way of a bonded channel having a frequency band that overlaps with the frequency bands of the first channel, first GF channel, second channel, second GF channel, third channel, third GF channel, and fourth channel. Or, alternatively, the lower and upper ends of the frequency band of the bonded channel substantially align in frequency with the lower end of the frequency band of the first channel and the upper end of the frequency band of the fourth channel, respectively. Similarly, a receiver may collect the L-CEF of the first, second, third, and fourth channels, and the OFDM CEF-GF of the first, second, and third GF channels to determine or generate a channel estimation associated with the bonded channel to facilitate the decoding of the data payload transmitted via the bonded channel.

Frame Format for SC WB with L-CEF and CEF-GF Transmitted Simultaneously

Figure 7A:
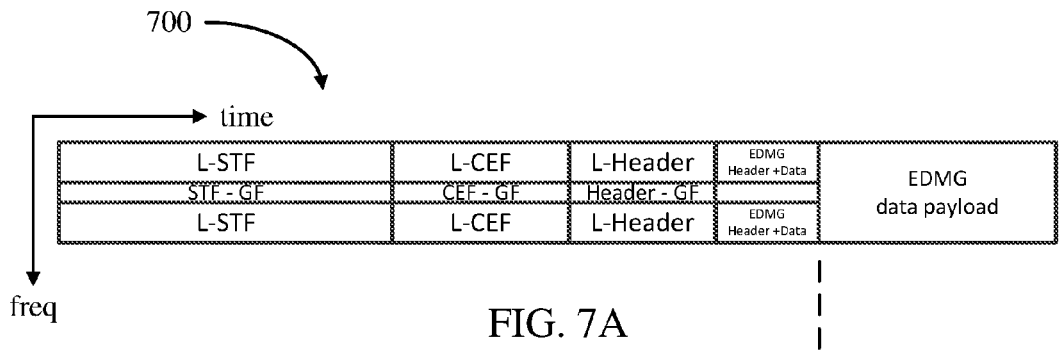
FIGS. 7A-7C illustrate a set of exemplary frames for transmission of data via a single carrier wideband (SC WB) transmission in accordance with certain aspects of the present disclosure.
Figure 7B:
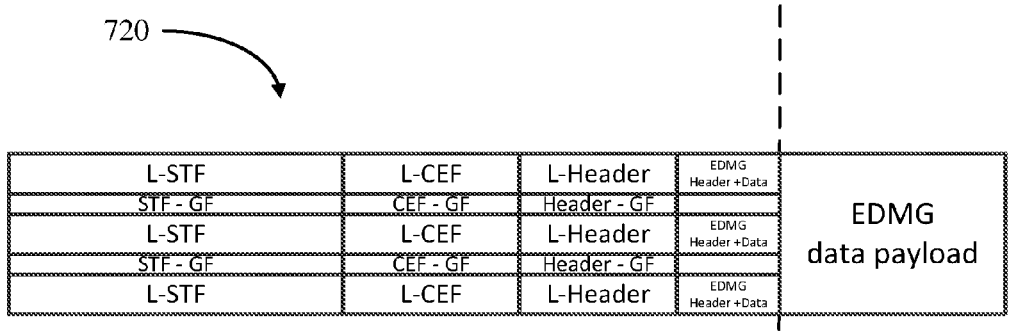
Figure 7C:
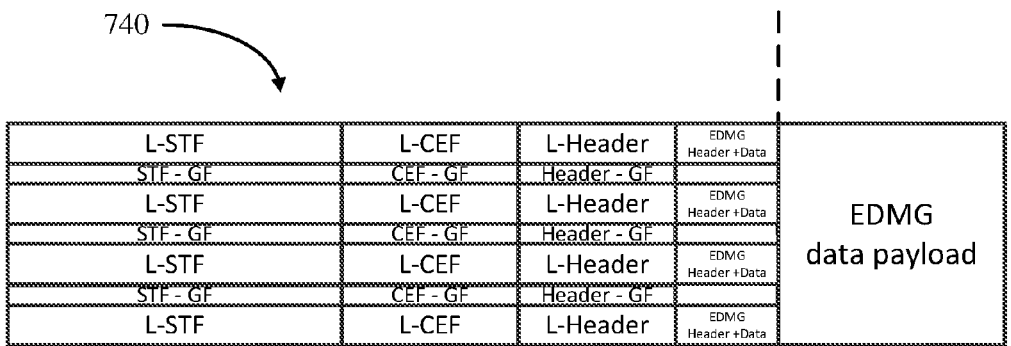

FIGS. 7A-7C illustrate exemplary frames 700, 720, and 740 for transmission of data via single carrier wideband (SC WB) transmission in accordance with an aspect of the disclosure. The frames 700, 720, and 740 may be example frames for transmitting the data payload via channel bonding of two, channel bonding of three, and channel bonding of four, respectively. The structures of the SC WB frames 700, 720, and 740 are substantially the same as the structures of the OFDM frames 420, 440, and 460, respectively. This has the advantage of simplifying the processing of both the SC WB and OFDM frames.

Figure 7D:
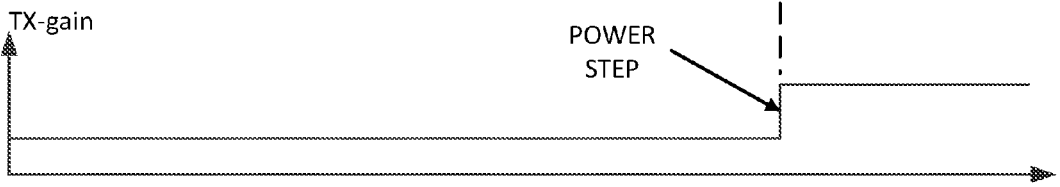
FIG. 7D illustrates an exemplary transmission power profile associated with the set of exemplary frames of FIGS. 7A-7C in accordance with certain aspects of the present disclosure.

The main difference between the SC WB frames 700, 720, and 740 and the OFDM frames 420, 440, and 460 is that the data payload is transmitted via a SC WB transmission in frames 700, 720, and 740, and the data payload is transmitted via an OFDM transmission in frames 420, 440, and 460. Other differences entail the L-STF, L-CEF, L-Header, and EDMG Header/data of the two or more channels, and the one or more GF channels being transmitted at a lower power than the EDMG data payload as indicated in the transmission power profile diagram of FIG. 7D. As previously discussed, the EDMG Header and the L-Header may include bits to signify the transmission power difference between the legacy portion and the EDMG portion of the frames. Also, the L-CEF of the SC WB frames 700, 720, and 740 may be based on a different Golay sequence than that of the L-CEF of the OFDM frames 420, 440, and 460, as indicated by the 802.11ad protocol.

Frame Format for SC WB with L-Header and CEF-GF Transmitted at the Same Time

FIGS. 8A-8D illustrates exemplary frames 800, 820, and 840 for transmission of data via single carrier wideband (SC WB) transmission in accordance with an aspect of the disclosure. The frames 800, 820, and 840 may be example frames for transmitting the data payload via a channel bonding of two, channel bonding of three, and channel bonding of four, respectively. The structures of the SC WB frames 800, 820, and 840 are substantially the same as the structures of the OFDM frames 500, 520, and 540, respectively. Again, this is done to simplify the processing of both the SC WB and OFDM frames.

Similarly, the main difference between the SC WB frames 800, 820, and 840 and the OFDM frames 500, 520, and 540 is that the data payload is transmitted via a SC WB transmission in frames 800, 820, and 840, and the data payload is transmitted via an OFDM transmission in frames 500, 520, and 4540. Other differences entail the L-STF, L-CEF, L-Header, and EDMG Header/data of the two or more channels, and the one or more GF channels being transmitted at a lower power than the EDMG data payload as indicated in the transmission power profile diagram of FIG. 8D. As previously discussed, the EDMG Header and the L-Header may include bits to signify the transmission power difference between the legacy portion and the EDMG portion of the frames. Also, the L-CEF of the SC WB frames 800, 820, and 840 may be based on a different Golay sequence than that of the L-CEF of the OFDM frames 520, 540, and 560, as indicated by the 802.11ad protocol.

Additional examples of frame structures or formats, and examples of apparatuses for generating the frame structures can be found in the Provisional Application titled "Frame Format for Facilitating Channel Estimation for Signals Transmitted via Bonded Channels,"Application No. 62/197,520 filed Jul. 27, 2015, the entire specification of which is incorporated herein by reference.

Channel Estimation at Receiver

A receiver is required to demodulate a signal that is received from a transmitter in order to recover data in the signal. The transmitter typically transmits the signal according to a well-defined wireless standard (e.g., IEEE 802.11ad and/or 802.11ay). However, the signal received at the receiver is not the clean signal transmitted at the transmitter. Rather, the signal is distorted by the channel between the transmitter and the receiver and/or polluted by noise. Thus, it is desirable for the receiver to restore the transmitted signal in order to recover data from the signal.

To facilitate signal restoration at the receiver, a wireless standard (e.g., IEEE 802.11ad and/or 802.11ay) may specify transmission of a known signal (e.g., channel estimation sequence (CES)) in the preamble of a frame. It is to be appreciated that a channel estimation sequence may also be refer to a channel estimation field (CEF). Since the CES is known by the receiver, the receiver can use the CES in the received signal to deduce the channel distortion (perform channel estimation). The receiver can then use this knowledge to restore the transmitted signal (e.g., payload symbols in the signal). This operation is also known as channel equalization.

In this regard, the following describes efficient techniques for performing channel estimation at a receiver according to certain aspects of the present disclosure. The techniques may be adapted according to knowledge of the CES used, as discussed further below.

Figures 9, 10:
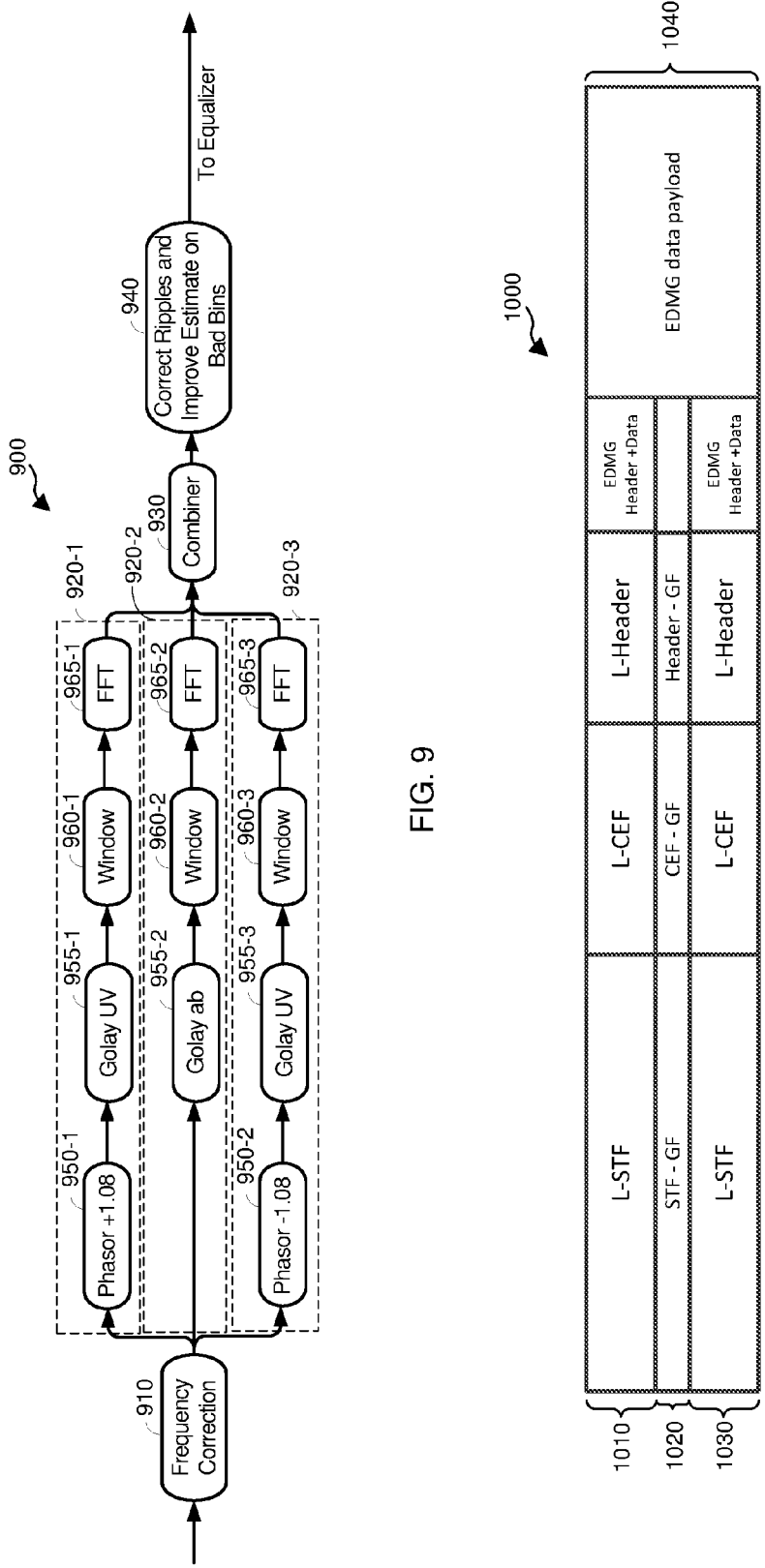
FIG. 9 illustrates an exemplary channel estimation subsystem for two channel bonding in accordance with certain aspects of the present disclosure.
FIG. 10 illustrates an exemplary frame for two channel bonding in accordance with certain aspects of the present disclosure.

FIG. 9 shows an exemplary channel estimation subsystem 900 for performing channel estimation using a frame structure for two channel bonding. In this example, the subsystem 900 comprises frequency correction circuitry 910, a plurality of channel estimation circuitries 920-1 to 920-3, a combiner 930, and ripple correction circuitry 940. The plurality of channel estimation circuitries 920-1 to 920-3 comprises first channel estimation circuitry 920-1, second channel estimation circuitry 920-2, and third channel estimation circuitry 920-3.

In operation, the receiver may frequency down convert a received signal to baseband, and input the frequency down-converted signal to the subsystem 900. In one aspect, the received signal may be a wide-band signal having the exemplary frame structure 1000 shown in FIG. 10. As used herein, the term "wide-band signal" may refer to a signal that is transmitted and/or received on two or more bonded channels. The frame structure 1000 may correspond to the frame structure 420 in FIG. 4B or the frame structure 700 in FIG. 7A. In this example, the frame structure 1000 includes a first CES (e.g., L-CEF) on a first channel 1010 (e.g., legacy channel having a bandwidth of approximately 1.76 GHz), a second CES (e.g., CEF-GF) on a second channel 1020 (e.g., gap-filler channel between two legacy channels having a bandwidth of approximately 400 MHz), and a third CES (e.g., L-CEF) on a third channel (e.g., legacy channel having a bandwidth of approximately 1.76 GHz). The frame structure 1000 also comprises a data payload (e.g., EDMG data payload) on a bonded channel 1040, in which the bonded channel may have a bandwidth encompassing the bandwidths of the first, second and third channels 1010, 1020 and 1030. In one aspect, the frequency down-conversion may center the CES (e.g., CEF-GF) on the second channel 1020 at approximately zero hertz.

Referring back to FIG. 9, the frequency correction circuitry 910 may first perform frequency correction on the input signal to correct for frequency differences between the transmitter and the receiver. For example, the frequency correction circuitry 910 may correct for carrier frequency offset between the transmitter and the receiver. The frequency-corrected signal is input to the first, second and third channel estimation circuitries 920-1 to 920-3, as shown in FIG. 9.

The first channel estimation circuitry 920-1 is configured to generate a channel estimation for the frequency band of the first channel 1010 using the CES on the first channel 1010. The second channel estimation circuitry 920-2 is configured to generate a channel estimation for the frequency band of second channel 1020 using the CES on the second channel 1020. Finally, the third channel estimation circuitry 920-3 is configured to generate a channel estimation for the frequency band of the third channel 1030 using the CES on the third channel 1030.

The combiner 930 receives the channel estimations for the different frequency bands, and generates a collective channel estimation (unified channel estimation) based on the received channel estimations. The collective channel estimation provides a channel estimation for a wide frequency band including the frequency bands of the first, second and third channels 1010, 1020 and 1030. As a result, the collective channel estimation may be used to perform channel equalization on the payload (e.g., EDMG data payload) of the frame 1000, which may have a frequency band approximately encompassing the frequency bands of the first, second and third channels 1010, 1020 and 1030. In one aspect, the collective channel estimation may comprise a concatenation of the channel estimations from the channel estimation circuitries 920-1 to 920-3 in the frequency domain, as discussed further below.

The ripple correction circuitry 940 may then perform ripple correction on the collective channel estimation to reduce ripples which originated in the transmitter. For example, the ripples may be induced by one or more filters in the transmitter. In this example, the filter characteristics of the one or more filters used in the transmitter may be known at the receiver (e.g., the filter characteristics may be specified in a standard). The receiver may use this knowledge to determine the ripples caused by the one or more filters, and therefore correct for the ripples. The collective channel estimation may then be fed to a channel equalizer (not shown), which may use the collective channel estimation to perform channel equalization on the received payload (e.g., EDMG data payload). After channel equalization, the payload may be demodulated and/or decoded to recover the data in the payload (e.g., according to the MCS used at the transmitter).

In the example in FIG. 9, the first channel estimation circuitry 920-1 comprises a first frequency shifter 950-1, a first cross-correlator 955-1, first window circuitry 960-1, and first Fourier Transform circuitry 965-1. The first frequency shifter 950-1 is configured to shift the frequency of the input signal (e.g., by approximately +1.08 gigahertz) to center the CES on the first channel 1010 at approximately zero hertz (baseband), where "+" refers to plus. This allows the first channel estimation circuitry 920-1 to generate a channel estimation for the frequency band of the first channel 1010. The frequency shift is needed since the input signal has the CES on the second channel 1020 centered at approximately zero hertz.

The frequency shift is needed also to allow for simple correlators in the time domain, e.g. Golay correlators, that work with few trivial {+1,0,−1} coefficients on high rate input signals, and still result in clean channel estimation in the specified band.

The first cross-correlator 955-1 performs cross-correlation on the CES on the first channel to generate the channel estimation for the frequency band of the first channel 1010. In this example shown in FIG. 9, the CES (e.g., L-CEF) on the first channel 1010 comprises a concatenation of complementary sequences Gu and Gv. Each of these sequence may be 512 samples in length and may comprise a different combination of four Golay sequences of length 128. Exemplary implementations of the first cross-correlator 955-1 may be found, for example, in U.S. Pat. No. 8,705,661, titled "Techniques for Channel Estimation in Millimeter Wave Communication Systems," filed on Feb. 29, 2012, the entire specification of which is incorporated herein by reference. In one example, re-sampling for the Gu and Gv sequences may be 2/9.

After the cross-correlation, the first window circuitry 960-1 may perform a windowing operation of the resulting channel estimation. The windowing operation improves the quality of the channel estimation by reducing the ripple effect that sharp filters have in the frequency domain. In one aspect, the following windowing function may be used to perform the windowing operation:

$$w_T(t) = \begin{cases} \sin^2\left(\frac{\pi}{2}\left(\frac{1}{2} + \frac{t}{T_R}\right)\right) & \frac{-T_R}{2} < t \le \frac{T_R}{2} \\ 1 & \frac{T_R}{2} < t \le T - \frac{T_R}{2} \\ \sin^2\left(\frac{\pi}{2}\left(\frac{1}{2} - \frac{t-T}{T_R}\right)\right) & T - \frac{T_R}{2} < t \le T + \frac{T_R}{2} \end{cases} \quad (1)$$

where T is a sequence length and $T_R$ is an overlap length. In one example, the sequence length T may be 512 samples and the overlap length $T_R$ may be 35 samples. It is to be appreciated that other parameter values may also be used. The windowing function according to equation (1) is taken from the IEEE 802.11ad standard, which specifies the use of the windowing function to smooth out transitions between adjacent fields and/or adjacent symbols at the transmitter. However, the IEEE 802.11ad standard does not contemplate using the windowing function for the purpose discussed above. Thus, the present disclosure applies the windowing function in a novel way to improve the quality of the channel estimation at the receiver. It is to be appreciated that the present disclosure is not limited to the exemplary windowing function in equation (1), and that other windowing functions may be used.

After windowing, the first Fourier Transform circuitry 965-1 transforms the channel estimation to the frequency domain to provide the channel estimation for the frequency band of the first channel 1010 in the frequency domain. In certain aspects, the Fourier Transform may be implemented using a Fast Fourier Transform (FFT) for computational efficiency.

The second channel estimation circuitry 920-2 comprises a second cross-correlator 955-2, second window circuitry 960-2, and second Fourier Transform circuitry 965-1. In this example, frequency shifting is not needed in the second channel estimation circuitry 920-2 since the CES on the second channel 1020 is already centered at approximately zero hertz, as discussed above.

The second cross-correlator 955-2 performs cross-correlation on the CES on the second channel 1020 to generate the channel estimation for the frequency band of the second channel 1020. In this example shown in FIG. 9, the CES (e.g., CEF-GF) on the second channel 1020 comprises a concatenation of sequences Ga and Gb, where each sequence may be 160 samples in length. The Ga and Gb sequences may be built by extending two Golay sequences of 20 by 8. The extension may be based on known Golay constructions, and sequence of 20 may be a basic Golay sequence. Exemplary implementations of the second cross-correlator 955-2 may be found, for example, in U.S. Pat. No. 8,705,661 discussed above. In one example, interpolation for the Ga and Gb sequences may be 1/27.

After the cross-correlation, the second window circuitry 960-2 may perform a windowing operation of the resulting channel estimation. The windowing operation may be similar to the windowing operation discussed above for the first window circuitry 960-1. After windowing, the second Fourier Transform circuitry 965-2 transforms the channel estimation to the frequency domain to provide the channel estimation for the frequency band of the second channel 1020 in the frequency domain.

The third channel estimation circuitry 920-3 comprises a second frequency shifter 950-2, a third cross-correlator 955-3, third window circuitry 960-3, and third Fourier Transform circuitry 965-3. The second frequency shifter 950-2 is configured to shift the frequency of the input signal (e.g., by approximately −1.08 gigahertz) to center the CES on the third channel 1030 at approximately zero hertz (baseband), where "−" refers to minus. This allows the third channel estimation circuitry 920-3 to generate a channel estimation for the frequency band of the third channel 1030.

The third cross-correlator 955-3 performs cross-correlation on the CES on the third channel 1030 to generate the channel estimation for the frequency band of the third channel 1030. The cross-correlation may be similar to the cross-correlation discussed above for the first cross-correlator 955-1. After the cross-correlation, the third window circuitry 960-3 may perform a windowing operation of the resulting channel estimation. The windowing operation may be similar to the windowing operation discussed above for the first window circuitry 960-1. After windowing, the third Fourier Transform circuitry 965-3 transforms the channel estimation to the frequency domain to provide the channel estimation for the frequency band of the third channel in the frequency domain.

Thus, in this example, the combiner 930 receives the channel estimations from the channel estimation circuitries 920-1 to 920-3 in the frequency domain. The combiner 930 generates a collective channel estimation (unified channel estimation) providing a channel estimation for a wide frequency band that encompasses the frequency bands of the first, second and third channels 1010, 1020 and 1030. An advantage of transforming each channel estimation to the frequency domain is that allows the combiner 930 to combine the channel estimations for the different frequency bands in a smooth way without the channel estimations interfering with each other. The collective channel estimation may be fed to the equalizer in the frequency domain. Alternatively, the collective channel estimation may be transformed to the time domain by an inverse Fourier Transform, and fed to the equalizer in the time domain.

Figure 8A:
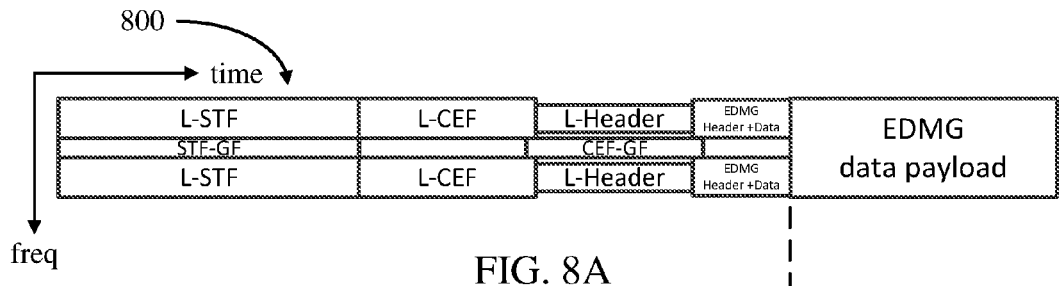
FIGS. 8A-8C illustrate another set of exemplary frames for transmission of data via a single carrier wideband (SC WB) transmission in accordance with certain aspects of the present disclosure.
Figure 8B:
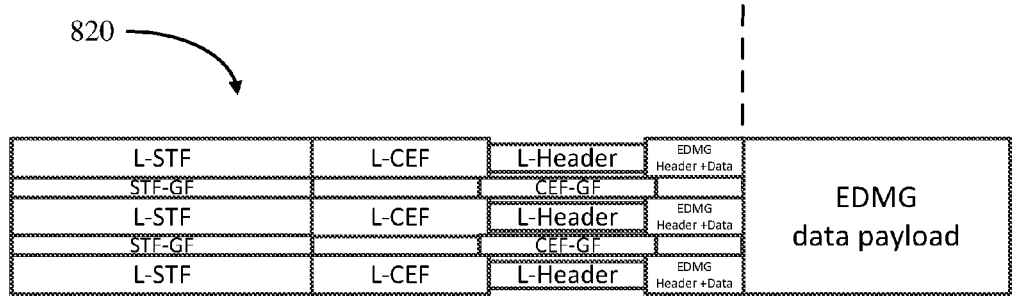
Figure 8C:
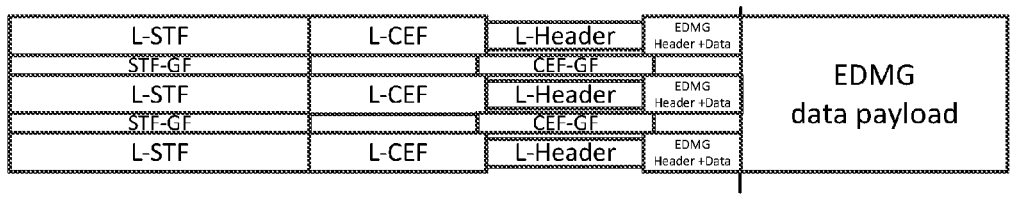
Figure 8D:
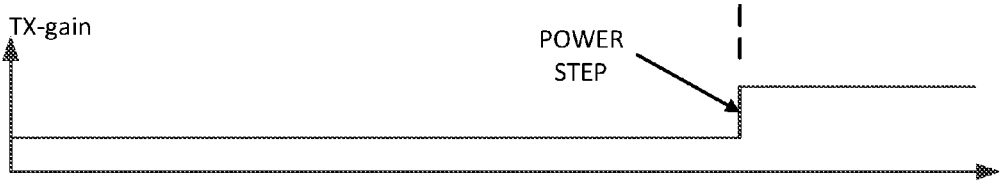
FIG. 8D illustrates an exemplary transmission power profile associated with the set of exemplary frames of FIGS. 8A-8C in accordance with certain aspects of the present disclosure.

Although operations of the channel estimation subsystem 900 are discussed above using the exemplary frame structure 1000 in FIG. 10, it is to be appreciated that the present disclosure is not limited to this example. For instance, the channel estimation subsystem 900 may perform channel estimation for a frame structure in which the CES on one channel is offset in time from the CES on another channel. Examples of this are shown in FIGS. 5A and 8A, in which the CES (e.g., CEF-GF) on the second channel (e.g. gap-filler channel) is offset in time from the CESs on the first and third channels (e.g., legacy channels) and overlaps the headers on the first and third channels. In these examples, the time offset between the CES on the second channel and the CESs on the first and third channels is known since the frame format is known. In this case, the second channel estimation circuitry 920-2 may wait for the CES on the second channel to be received according to the known time offset before performing channel estimation. Thus, embodiments of the present disclosure do not require that the CES on the different channels be aligned in time.

The channel estimation subsystem 900 may be implemented in receive processor 242 or 282 in FIG. 2. It is to be appreciated that the channel estimation circuitries 920-1 to 920-3 are not required to operate in parallel. For example, the operations of the channel estimation circuitries 920-1 to 920-3 may be performed sequentially by the same processor. In this example, samples of the input signal may be stored in memory. The processor may then perform the operations for each channel of the estimation circuitries 920-1 to 920-3 by retrieving the input samples from the memory, performing channel estimation for the respective channel using the input samples, and storing the resulting channel estimation in the memory. Once all of the channel estimations are generated, the processor may combined the channel estimation to generate the collective channel estimation (unified channel estimation), as discussed above. In short, the present disclosure is not limited to a particular implementation of the channel estimation subsystem 900.

Figures 11, 12:
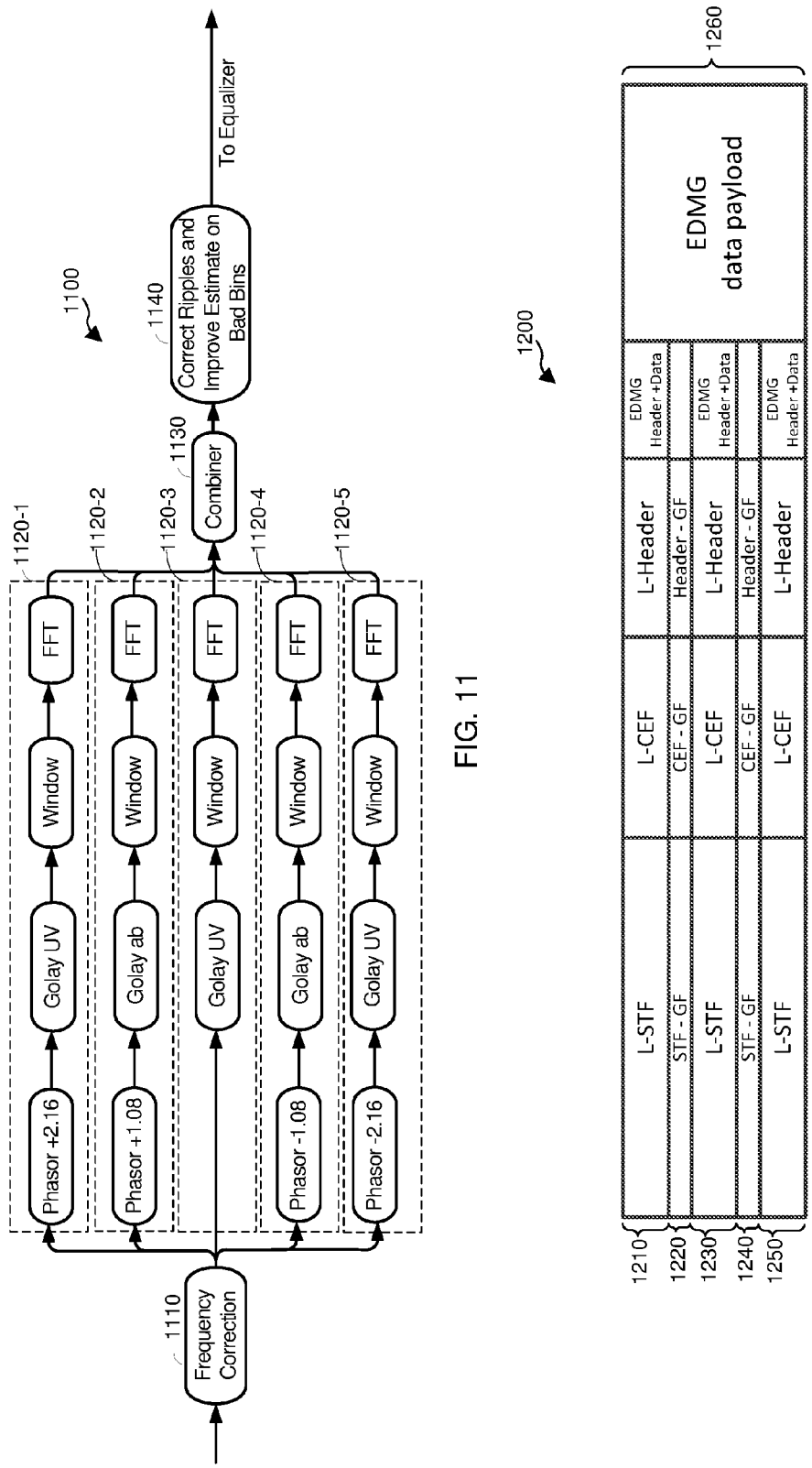
FIG. 11 illustrates an exemplary channel estimation subsystem for three channel bonding in accordance with certain aspects of the present disclosure.
FIG. 12 illustrates an exemplary frame for three channel bonding in accordance with certain aspects of the present disclosure.

FIG. 11 shows an exemplary channel estimation subsystem 1100 for performing channel estimation using a frame structure for three channel bonding. The subsystem 1100 is similar to the subsystem 900 for the two channel bonding case with the addition of two more channel estimation circuitries. Thus, the subsystem 900 architecture in FIG. 9 may be extended to perform channel estimation for a larger number of bonded channels.

In example in FIG. 11, the subsystem 1100 comprises frequency correction circuitry 1110, a plurality of channel estimation circuitries 1120-1 to 1120-5, a combiner 1130, and ripple correction circuitry 1140. The plurality of channel estimation circuitries 1120-1 to 1120-5 comprises first channel estimation circuitry 1120-1, second channel estimation circuitry 1120-2, third channel estimation circuitry 1120-3, fourth channel estimation circuitry 1120-4, and fifth channel estimation circuitry 1120-5.

In operation, the receiver may frequency down convert a received signal to baseband, and input the frequency down-converted signal to the subsystem 1100. In one aspect, the received signal may be a wide-band signal having the exemplary frame structure 1200 shown in FIG. 12. The frame structure 1200 may correspond to the frame structure 440 in FIG. 4C or the frame structure 720 in FIG. 7B. In this example, the frame structure 1200 includes a first CES (e.g., L-CEF) on a first channel 1210 (e.g., legacy channel having a bandwidth of approximately 1.76 GHz), a second CES (e.g., CEF-GF) on a second channel 1220 (e.g., gap-filler channel having a bandwidth of approximately 400 MHz), a third CES (e.g., L-CEF) on a third channel 1230 (e.g., legacy channel having a bandwidth of approximately 1.76 GHz), a fourth CES (e.g., CEF-GF) on a fourth channel 1240 (e.g., gap-filler channel having a bandwidth of approximately 400 MHz), and a fifth CES (e.g., L-CEF) on a fifth channel 1250 (e.g., legacy channel having a bandwidth of approximately 1.76 GHz). The frame structure 1200 also comprises a data payload (e.g., EDMG data payload) on a bonded channel 1260, in which the bonded channel may have a bandwidth encompassing the bandwidths of the first, second, third, fourth and fifth channels 1210 to 1250. In one aspect, the frequency down-conversion may center the CES (e.g., L-CEF) on the third channel 1230 at approximately zero hertz.

Referring back to FIG. 11, the frequency correction circuitry 1110 may first perform frequency correction on the input signal to correct for frequency differences between the transmitter and the receiver, similar to the frequency correction circuitry 910 in FIG. 9.

The first, second, third, fourth and fifth channel estimation circuitries 1120-1 to 1120-5 correspond to the first, second, third, fourth and fifth channels 1210 to 1250, respectively. Each of the estimation circuitries 1120-1 to 1120-5 is configured to generate a channel estimation for the frequency band of the corresponding channel using the CES on the corresponding channel. As shown in FIG. 11, each of the channel estimation circuitries 1120-1 to 1120-5 comprises a cross-correlator, window circuitry and Fourier Transform circuitry, the operations of which are discussed above with respect to FIG. 9. Each of the first, second, fourth and fifth channel estimation circuitries shifts the frequency of the input signal by a respective shift frequency (e.g., +2.16 GHz, +1.08 GHz, −1.08 GHz or −2.16 GHz) so that the CES on the respective channel is approximately centered at zero hertz. In this example, the third channel estimation circuitry 1120-3 does not frequency shift the input signal since the CES on the third channel 1230 is already centered at approximately zero hertz.

The combiner 1130 receives the channel estimations for the different frequency bands, and generates a collective channel estimation (unified channel estimation) based on the received channel estimations. The collective channel estimation provides a channel estimation for a wide frequency band including the frequency bands of the first, second, third, fourth and fifth channels 1210 to 1250. As a result, the collective channel estimation may be used to perform channel equalization on the payload (e.g., EDMG data payload) of the frame 1200, which may have a frequency band approximately encompassing the frequency bands of the first, second, third, fourth and fifth channels 1210 to 1250.

The ripple correction circuitry 1140 may then perform ripple correction on the collective channel estimation to reduce ripples which originated in the transmitter, similar to the ripple correction circuitry 940 in FIG. 9. The collective channel estimation may then be fed to a channel equalizer (not shown), which may use the collective channel estimation to perform channel equalization on the received payload (e.g., EDMG data payload). After channel equalization, the payload may be demodulated and/or decoded to recover the data in the payload (e.g., according to the MCS used at the transmitter).

Figure 13:
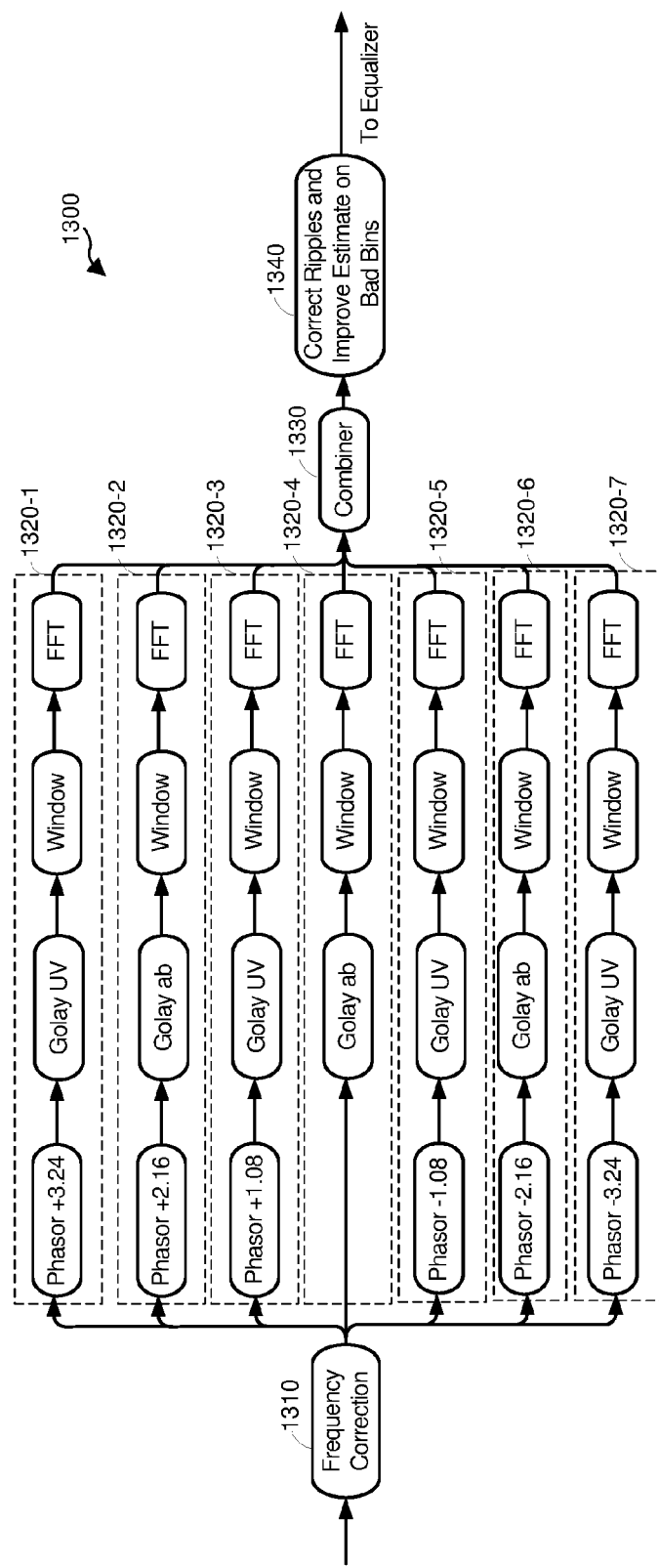
FIG. 13 illustrates an exemplary channel estimation subsystem for four channel bonding in accordance with certain aspects of the present disclosure.

FIG. 13 shows an exemplary channel estimation subsystem 1300 for performing channel estimation using a frame structure for four channel bonding. The subsystem 1300 is similar to the subsystem 1100 for the three channel bonding case with the addition of two more channel estimation circuitries.

In example in FIG. 13, the subsystem 1300 comprises frequency correction circuitry 1310, a plurality of channel estimation circuitries 1320-1 to 1320-7, a combiner 1330, and ripple correction circuitry 1340. The plurality of channel estimation circuitries 1320-1 to 1320-7 comprises first channel estimation circuitry 1130-1, second channel estimation circuitry 1130-2, third channel estimation circuitry 1320-3, fourth channel estimation circuitry 1320-4, fifth channel estimation circuitry 1320-5, sixth channel estimation circuitry 1320-6, and seventh channel estimation circuitry 1320-7.

Figure 14:
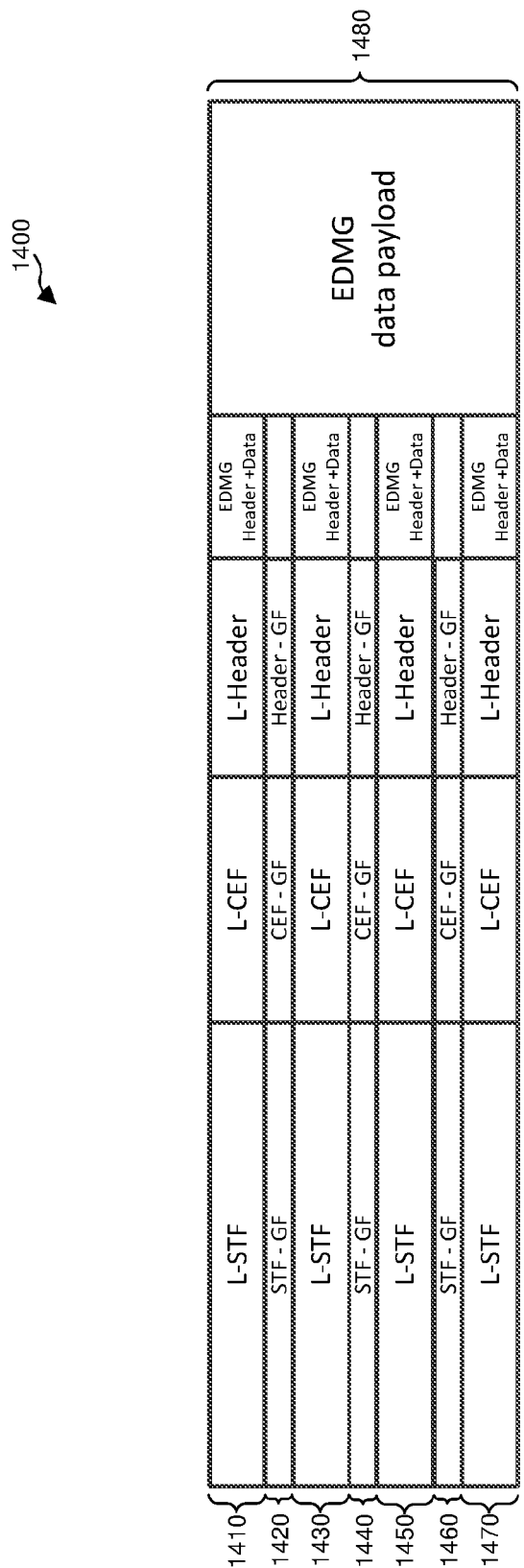
FIG. 14 illustrates an exemplary frame for four channel bonding in accordance with certain aspects of the present disclosure.

In operation, the receiver may frequency down convert a received signal to baseband, and input the frequency down-converted signal to the subsystem 1300. In one aspect, the received signal may be a wide-band signal having the exemplary frame structure 1400 shown in FIG. 14. The frame structure 1400 may correspond to the frame structure 460 in FIG. 4D or the frame structure 740 in FIG. 7C. In this example, the frame structure 1400 includes a first CES (e.g., L-CEF) on a first channel 1410 (e.g., legacy channel having a bandwidth of approximately 1.76 GHz), a second CES (e.g., CEF-GF) on a second channel 1420 (e.g., gap-filler channel having a bandwidth of approximately 400 MHz), a third CES (e.g., L-CEF) on a third channel 1430 (e.g., legacy channel having a bandwidth of approximately 1.76 GHz), a fourth CES (e.g., CEF-GF) on a fourth channel 1440 (e.g., gap-filler channel having a bandwidth of approximately 400 MHz), a fifth CES (e.g., L-CEF) on a fifth channel 1450 (e.g., legacy channel having a bandwidth of approximately 1.76 GHz), a sixth CES (e.g., CEF-GF) on a sixth channel 1460 (e.g., gap-filler channel having a bandwidth of approximately 400 MHz), and a seventh CES (e.g., L-CEF)

on a seventh channel 1270 (e.g., legacy channel having a bandwidth of approximately 1.76 GHz). The frame structure 1400 also comprises a data payload (e.g., EDMG data payload) on a bonded channel 1480, in which the bonded channel may have a bandwidth encompassing the bandwidths of the first, second, third, fourth, fifth, sixth and seventh channels 1410 to 1470. In one aspect, the frequency down-conversion may center the CES (e.g., CEF-GF) on the fourth channel 1440 at approximately zero hertz.

Referring back to FIG. 13, the frequency correction circuitry 1310 may first perform frequency correction on the input signal to correct for frequency differences between the transmitter and the receiver, similar to the frequency correction circuitry 910 in FIG. 9.

The first, second, third, fourth, fifth, sixth and seventh channel estimation circuitries 1320-1 to 1320-7 correspond to the first, second, third, fourth, fifth, sixth and seventh channels 1410 to 1470, respectively. Each of the estimation circuitries 1320-1 to 1320-7 is configured to generate a channel estimation for the frequency band of the corresponding channel using the CES on the corresponding channel. As shown in FIG. 13, each of the channel estimation circuitries 1320-1 to 1320-7 comprises a cross-correlator, window circuitry and Fourier Transform circuitry, the operations of which are discussed above with respect to FIG. 9. Each of the first, second, third, fifth, sixth and seventh channel estimation circuitries 1320-1, 1320-2, 1320-3, 1320-5, 1320-6 and 1320-7 shifts the frequency of the input signal by a respective shift frequency (e.g., +3.24 GHz, +2.16 GHz, +1.08 GHz, −1.08 GHz, −2.16 GHz or −3.24 GHz) so that the CES on the respective channel is approximately centered at zero hertz. In this example, the fourth channel estimation circuitry 1320-4 does not frequency shift the input signal since the CES on the fourth channel 1440 is already centered at approximately zero hertz.

The combiner 1330 receives the channel estimations for the different frequency bands, and generates a collective channel estimation (unified channel estimation) based on the received channel estimations. The collective channel estimation provides a channel estimation for a wide frequency band including the frequency bands of the channels 1410 to 1470. As a result, the collective channel estimation may be used to perform channel equalization on the payload (e.g., EDMG data payload) of the frame 1400, which may have a frequency band approximately encompassing the frequency bands of the channels 1410 to 1470.

The ripple correction circuitry 1340 may then perform ripple correction on the collective channel estimation to reduce ripples which originated in the transmitter, similar to the ripple correction circuitry 940 in FIG. 9. The collective channel estimation may then be fed to a channel equalizer (not shown), which may use the collective channel estimation to perform channel equalization on the received payload (e.g., EDMG data payload). After channel equalization, the payload may be demodulated and/or decoded to recover the data in the payload (e.g., according to the MCS used at the transmitter).

In certain aspects, there may be a small gap between the frequency bands of adjacent channels. As a result, there may be two small gaps for two channel bonding, four small gaps for three channel bonding, and six small gaps for four channel bonding. To improve channel estimation in the small gaps, interpolation techniques can be used.

In this regard, FIG. 15 shows an exemplary subsystem 1500 for two channel bonding further comprising gap interpolation circuitry 1510. The gap interpolation circuitry 1510 may be located between the combiner 930 and ripple correction circuitry 940, as shown in FIG. 15. For each small gap, the gap interpolation circuitry 1510 may interpolate a channel estimation for the small gap using channel estimation information at the edges of the two adjacent channels. For example, the channel estimation information for each of the adjacent channels may include a portion of the respective channel estimation within a portion of the respective frequency band located at the respective edge of the gap in frequency, near the respective edge of the gap in frequency, or both. The interpolation may be based on spline, low-pass filter (LPF), or any similar method. Since the maximum delay spread is known, simple interpolation may be used. More advanced interpolation methods may use configurable interpolation based on delay spread measured by a CES that is known (e.g., based on Golay UV). In certain aspects, linear interpolation may be used. It is to be appreciated that the gap interpolation circuitry 1510 is not limited to the exemplary subsystem 1500 in FIG. 15, and may also be used in a subsystem for three or four channel bonding (e.g., subsystem 1100 or 1300).

In certain aspects, the collective channel estimation may be filtered by a LPF in the frequency domain to reduce noise in the collective channel estimation (e.g., caused by noise added to the CES). Such filtering may also be known as smoothing filtering. Simple filtering may be used since the maximum delay spread being supported is known. More advanced filter methods may use a configurable cutoff frequency based on delay spread measured by a CES that is known (e.g., based on Golay UV). FIG. 16 shows an exemplary subsystem 1600 for two channel bonding further comprising a low-pass filter 1610 for reducing noise in the collective channel estimation, as discussed above. It is to be appreciated that the filter 1610 is not limited to the exemplary subsystem 1600 in FIG. 16, and may also be used in a subsystem for three or four channel bonding (e.g., subsystem 1100 or 1300).

In certain aspects, the collective channel estimation may be filtered by performing channel zeroing. When looking at the channel estimation impulse response in the time domain, the number of non-zero taps is smaller than the number of taps in many cases. However, in practical receivers all taps will have some energy due to noise that is received during CES reception. In this regard, channel zeroing may be performed in the time domain to reduce this noise, as discussed further below.

Figure 17:
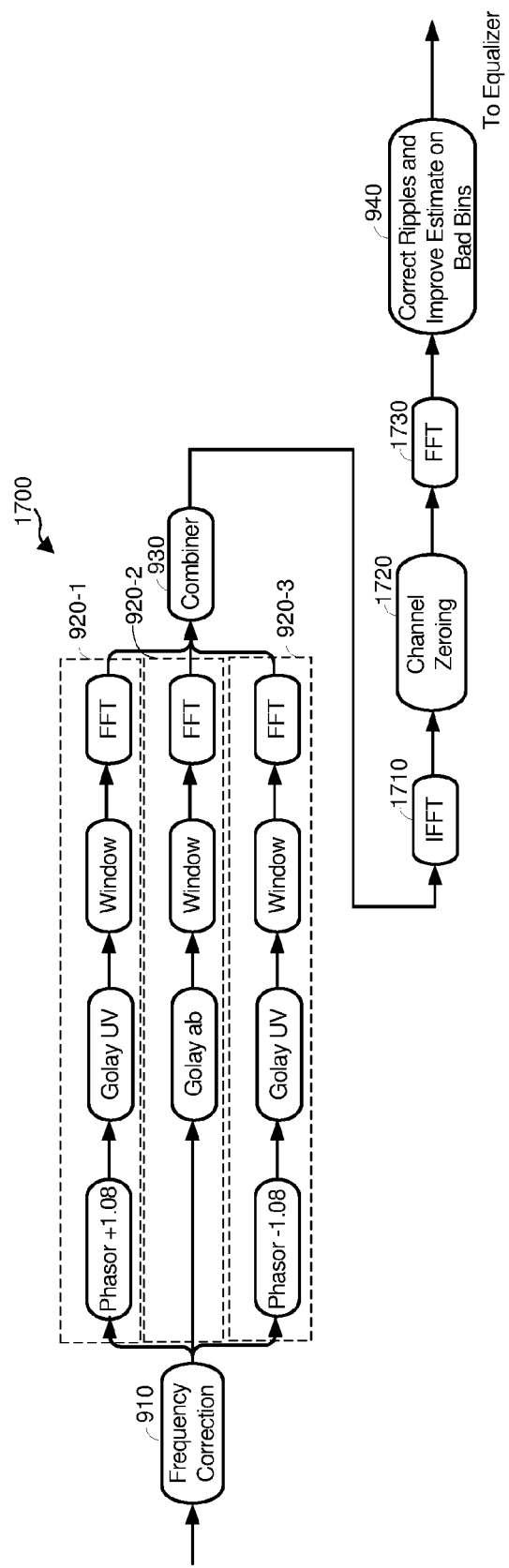
FIG. 17 illustrates an exemplary channel estimation subsystem using channel zeroing in accordance with certain aspects of the present disclosure.

Since channel zeroing is performed in the time domain, the collective channel estimation may be transformed to the time domain (e.g., by an inverse Fourier Transform) to perform the channel zeroing. After channel zeroing, the collective channel estimation may be transformed back to the frequency domain (e.g., by a Fourier Transform). In this regard, FIG. 17 shows an exemplary subsystem 1700 for two channel bonding further comprising inverse Fast Fourier Transform (IFFT) circuitry 1710, channel zeroing circuitry 1720, and Fast Fourier Transform (FFT) circuitry 1730 according to certain aspects. The IFFT circuitry 1710 transforms the collective channel estimation from the combiner 930 to the time domain for channel zeroing. The channel zeroing circuitry 1720 then performs channel zeroing on the channel estimation in the time domain. After channel zeroing, the FFT circuitry 1730 transforms the channel estimation back to the frequency domain. It is to be appreciated that the channel zeroing circuitry 1720 is not limited to the exemplary subsystem 1700 in FIG. 17, and may also be used in a subsystem for three or four channel bonding (e.g., subsystem 1100 or 1300).

The channel zeroing circuitry 1720 may receive the channel estimation in the time domain as a long vector comprising taps, which may be evenly spaced. The goal of channel zeroing may be to reduce noise by zeroing out taps that are only noise. The channel zeroing circuitry 1720 may perform channel estimation using any one of a variety of methods. In one method, channel zeroing may be performed by setting to zero all taps having values that are smaller than a predetermine threshold. In this method, taps with values below the threshold are assumed to be non-real (noise) and therefore set to zero. The threshold may be set according to an estimate of the receiver signal-to-noise ratio (SNR). In certain aspects, the threshold may be adaptive, in which the threshold may be adjusted based on measured SNR at the receiver. In these aspects, the SNR may be measured based on the received STF or CES.

In another method, channel zeroing may be performed based on accumulated energy, in which each tap has a power significance (value squared). In this example, the channel zeroing circuitry 1720 may sort the absolute values of all taps, square and take the largest. The channel zeroing circuitry 1720 may continue to take taps in this manner until the accumulated power of the taps that are taken reaches a certain criteria (e.g., 95% of the total taps power). In this case, the remaining taps may be zeroed.

In another method, the channel zeroing circuitry 1720 can assume that the maximum channel length is Tmax (a value), and then starting from the first non-zero tap allow only those that are closer than Tmax. This rule also can be used if one knows the maximum channel that the receiver can handle. Even if there are some taps later, they can be removed since they cannot be used. The first non-zero tap may be identified using a variety of methods. A simple method may be implemented as follows: detect a first tap x to pass a threshold, then start with tap x-n as the first non-zero tap, where n may be five or another value.

It is to be appreciated that the additional circuitries shown in FIGS. 15-17 may be used in combination. For example, a subsystem may include any combination of the gap interpolation circuitry 1510, the low-pass filter 1610, and the channel zeroing circuitry 1720.

Figure 18:
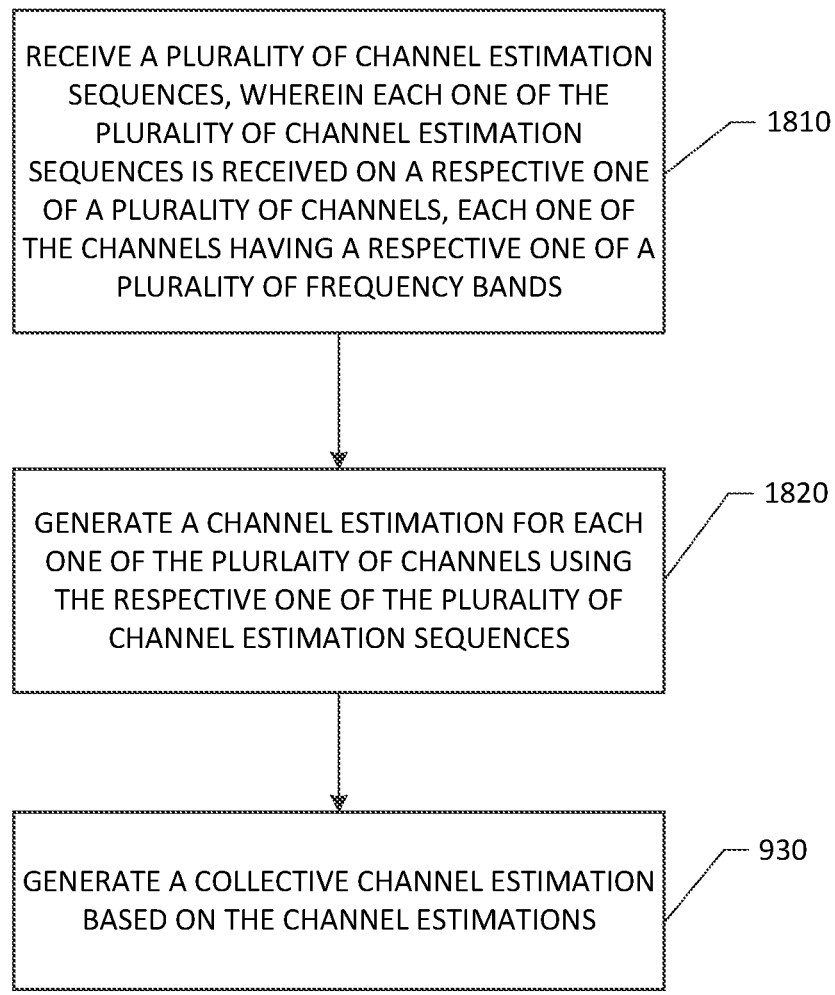
FIG. 18 is a flowchart of a method for wireless communication in accordance with certain aspects of the present disclosure.

FIG. 18 shows a flowchart of an exemplary method 1800 for wireless communications according to certain aspects of the present disclosure. The method 1800 may be performed by any of the subsystems shown in FIGS. 9, 11 and 13.

At step 1810, a plurality of channel estimation sequences is received, wherein each one of the plurality of channel estimation sequences is received on a respective one of a plurality of channels, each one of the plurality of channels having a respective one of a plurality of frequency bands. For example, each channel estimation sequence (e.g., L-CEF or CEF-GF) may be received on a legacy channel or gap-filler channel.

At step 1820, a channel estimation is generated for each one of the plurality of channels using the respective one of the plurality of channel estimation sequences. For example, each channel estimation may be generated by performing cross-correlation on the respective channel estimation sequence.

At step 1830, a collective channel estimation is generated based on the channel estimations. For example, the collective channel estimation (unified channel estimation) may comprise a concatenation of the channel estimations in the frequency domain.

The method 1800 may further include receiving a data payload on a wide-band channel, the wide-band channel (e.g., bonded channel) having a wide frequency band including the plurality of frequency bands, and performing channel equalization on the received data payload using the collective channel estimation.

Another method for estimating the channel is by using cross-correlation in frequency domain over the frequency band of the transmitted signal. Using the frequency domain approach (rather than time domain) is more efficient since it requires only one-tap equalizer, saving computation effort.

Figure 19:
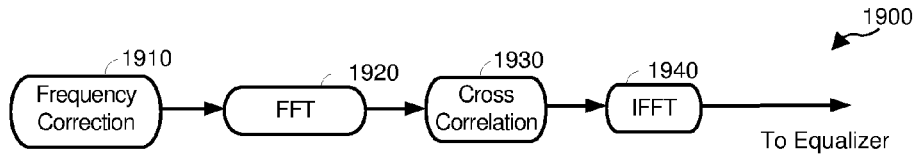
FIG. 19 illustrates a subsystem configured to perform cross correlation in the frequency domain according to certain aspects of the present disclosure.

In this regard, FIG. 19 shows an exemplary channel estimation subsystem 1900 configured to perform cross-correlation in the frequency domain in accordance with certain aspects of the present disclosure. The subsystem 1900 comprises frequency correction circuitry 1910, Fast Fourier Transform (FFT) circuitry 1920, cross-correlation circuitry 1930, and inverse FFT (IFFT) circuitry 1940.

In operation, the frequency correction circuitry 1910 corrects the received input signal for frequency differences between the transmitter and receiver, as discussed above. The FFT circuitry 1920 transforms the input signal to the frequency domain over the frequency band of the signal. For example, if the input signal includes three channels, then the frequency band of the input signal may encompass the frequency bands of the three channels. For the example of three bands, the FFT size which is required for the cross-correlation in the frequency domain may be 1024*3*1.5=4608, where 1024 is the number of samples for the CES of each channel, three is the number of channels, and 1.5 accounts for oversampling (e.g., in accordance with 802.11ad standard).

The cross-correlation circuitry 1930 then performs cross-correlation on the input signal in the frequency domain. The cross-correlation is between the frequency domain representation of the input signal and the reference signal (the transmitted CESs, which is known). In this case the cross-correlation may be done by a complex multiplier per frequency element. The result is then converted back to the time domain (time cross-correlation) by the IFFT circuitry 1940.

It should be noted that the FFT of the reference signal (the transmitted CESs—known) can be done off line or a priori and stored in a memory. It should also be noted that the IFFT (at the end) can be saved in some cases, if the equalizer is operating in frequency domain (no need to perform IFFT followed by FFT since they cancel each other). Additional techniques to improve the performance are given below.

Figure 20:
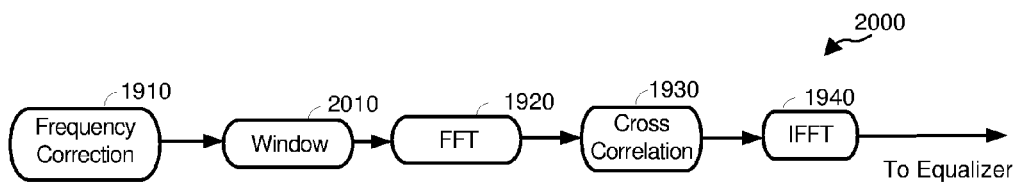
FIG. 20 illustrates a subsystem configured to perform a windowing operation according to certain aspects of the present disclosure.

The transmitted CES and the received CES are not cyclic (due to the nature of their content). This causes some artifacts in the CE since Fourier Transform (and FFT) are cyclic. This may also cause EVM degradation. One method to reduce the impact is to perform windowing on the received CES and reference CES before the FFT. In this regard, FIG. 20 shows an exemplary subsystem 2000 comprising window circuitry 2010 configured to perform a windowing operation on the input signal before the FFT. The windowing function in equation (1) above can be used with the following parameters:

CB of 2: $T_R=150$
$T=1024*1.5*2 (=3072)$
CB of 3: $T_R=220$
$T=1024*1.5*3 (=4608)$
CB of 4: $T_R=300$
$T=1024*1.5*4 (=6144)$

It is to be appreciated that the values for $T_R$ given above are exemplary only, and that other values may be used.

In addition to the above, the CE can be filtered by performing channel zeroing. When looking at the channel estimation impulse response in the time domain, the number of non-zero taps is smaller than the number of taps in many cases. However, in practical receivers all taps will have some energy due to noise that is received during CES reception. In this regard, channel zeroing may be performed in the time domain to reduce this noise, as discussed further below.

The channel zeroing may be done by setting to zero all the taps that are smaller than a threshold. The threshold itself may be adaptive and based on the received SNR, which can be measured using the STF or the CES. The channel zeroing may also be performed using any of the techniques discussed above.

Figure 21:
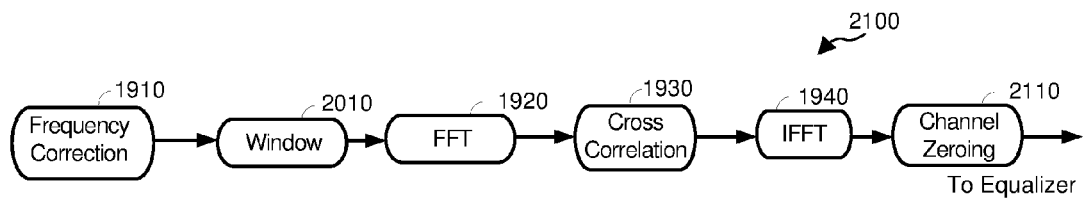
FIG. 21 illustrates a subsystem configured to perform cross correlation in the frequency domain and channel zeroing according to certain aspects of the present disclosure.

The channel zeroing requires that the CE is converted to time domain (by IFT or IFFT) and then converted back to frequency domain if necessary (by FT or FFT). In this regard, FIG. 21 shows an exemplary subsystem 2100 in accordance with certain aspects comprising channel zeroing circuitry 2110 configured to perform channel zeroing on the output of the IFFT circuitry 1940.

Figure 22:
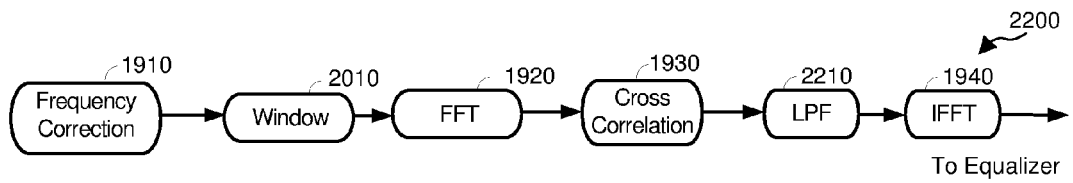
FIG. 22 illustrates a subsystem configured to perform cross correlation and low-pass filtering in the frequency domain according to certain aspects of the present disclosure.

In addition to the above, the CE can be filtered by any type of LPF to reduce the noise caused by noise added to the CES. Such filtering is also known as smoothing filtering. Simple filtering can be used since maximum delay spread supported is known. More advanced filtering methods can use configurable cutoff frequency based on delay spread measured by the CE that is known (e.g., based on Golay UV). FIG. 22 shows an exemplary subsystem 2200 comprising a low-pass filter 2210 between the cross-correlation circuitry 1930 and the IFFT circuitry 1940.

Frequency domain correlation was presented above including additional options to improve the estimation and the performance.

Figure 23:
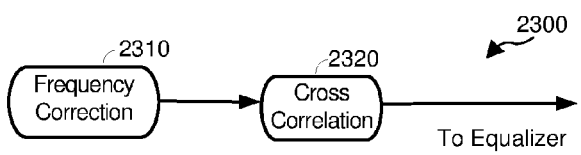
FIG. 23 illustrates a subsystem configured to perform cross correlation in the time domain according to certain aspects of the present disclosure.

It is possible to achieve the same by performing cross-correlation in the time domain. From a practical point of view this approach may be less attractive due to the additional computation load. If time domain correlation is used, then the FFT circuitry 1920, cross-correlation circuitry 1930 and IFFT circuitry 1940 are replaced with time domain cross-correlation. In this regard, FIG. 23 shows a subsystem 2300 comprising frequency correction circuitry 2310 and cross-correlation circuitry 2320 configured to perform cross-correlation in the time domain. The additional methods (options) presented above are also applicable here. One may need to add FFT and IFFT where needed to convert from frequency domain to time domain and back.

Figure 24:
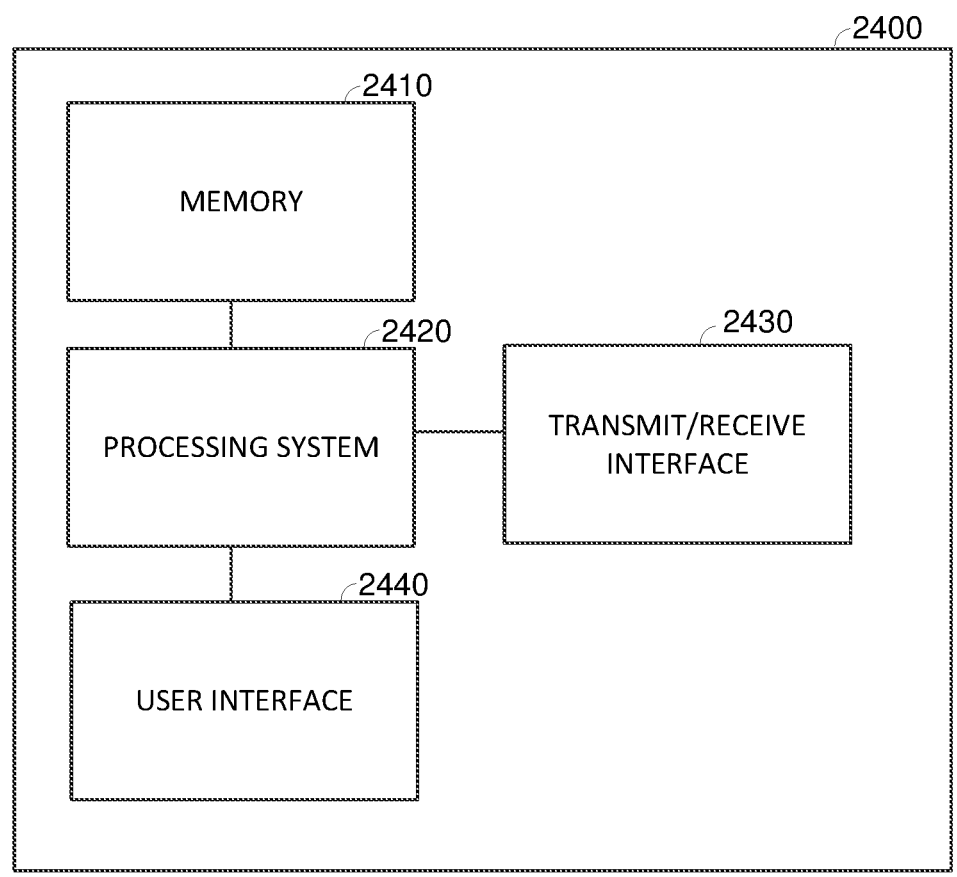
FIG. 24 illustrates an exemplary device in accordance with certain aspects of the present disclosure.

FIG. 24 illustrates an example device 2400 according to certain aspects of the present disclosure. The device 2400 may be configured to operate in a wireless node (e.g., access point 210 or access terminal 220) and to perform one or more of the operations described herein. The device 2400 includes a processing system 2420, and a memory 2410 coupled to the processor system 2420. The memory 2410 may store instructions that, when executed by the processing system 2420, cause the processing system 2420 to perform one or more of the operations described herein. Exemplary implementations of the processing system 2420 are provided below. The device 2400 also comprises a transmit/receiver interface 2430 coupled to the processing system 2420. The interface 2430 (e.g., interface bus) may be configured to interface the processing system 2420 to a radio frequency (RF) front end (e.g., transceivers 226-1 to 226-N or 226-1 to 266-N).

In certain aspects, the processing system 2420 may include one or more of the following: a transmit data processor (e.g., transmit data processor 218 or 260), a frame builder (e.g., frame builder 222 or 262), a transmit processor (e.g., transmit processor 224 or 264) and/or a controller (e.g., controller 234 or 274) for performing one or more of the operations described herein.

In the case of an access terminal 220, the device 2400 may include a user interface 2440 coupled to the processing system 2420. The user interface 2440 may be configured to receive data from a user (e.g., via keypad, mouse, joystick, etc.) and provide the data to the processing system 2420. The user interface 2440 may also be configured to output data from the processing system 2420 to the user (e.g., via a display, speaker, etc.). In this case, the data may undergo additional processing before being output to the user. In the case of an access point 210, the user interface 2440 may be omitted.

The transmit/receiver interface 2430, transceivers 226-1 to 226-N, and/or transceivers 266-1 to 266-N are examples of means for receiving a plurality of channel estimation sequences, wherein each one of the plurality of channel estimation sequences is received on a respective one of a plurality of channels, each one of the plurality of channels having a respective one of a plurality of frequency bands. The processing system 2420, receive processor 242, receive processor 282, channel estimation circuitries 920-1 to 920-3, channel estimation circuitries 1120-1 to 1120-5, and/or channel estimation circuitries 1320-1 to 1320-7 are examples of means for generating a channel estimation for each one of the plurality of channels using the respective one of the plurality of channel estimation sequences. The processing system 2420, receive processor 242, receive processor 282, combiner 930, combiner 1130, and/or combiner 1330 are examples of means for generating a collective channel estimation based on the channel estimations. The processing system 2420, receive processor 242, and/or receive processor 282 are examples of means for receiving a data payload on a wide-band channel, the wide-band channel having a wide frequency band including the plurality of frequency bands. The processing system 2420, receive processor 242, and/or receive processor 282 are examples of means for performing channel equalization on the received data payload using the collective channel estimation. The processing system 2420, receive data processor 244, and/or receive data processor 284 are examples of means for decoding the data payload after the channel equalization to recover data from the data payload. The processing system 2420, receive processor 242, and/or receive processor 282 are examples of means for receiving a header on the first one of the plurality of channels, wherein reception of the channel estimation sequence on the second one of the plurality of channels substantially overlaps reception of the header in time. The processing system 2420, receive processor 242, receive processor 282, and/or cross-correlators 955-1 to 955-3 are examples of means for performing cross-correlation on the respective one or more Golay sequences. The processing system 2420, receive processor 242, receive processor 282, and/or Fourier transform circuitries 965-1 to 965-3 are examples of means for converting each one of the channel estimations to a frequency domain using a Fourier transform. The processing system 2420, receive processor 242, receive processor 282, combiner 930, combiner 1130 and/or 1330 are examples of means for generating the collective channel estimation in the frequency domain based on the channel estimations in the frequency domain. The processing system 2420, receive processor 242, receive processor 282, and/or window circuitries 960-1 to 960-3 are examples of means for performing a windowing operation on each one of the channel estimations to smooth out transitions in the channel estimation. The processing system 2420, receive processor 242, receive processor 282, and/or frequency shifters 950-1 and 950-2 are examples of means for centering each one of two or more of the plurality of channels at approximately zero hertz by shifting the channel by a respective one of a plurality of shift frequencies. The processing system 2420, receive processor 242, receive processor 282, and/or gap interpolation circuitry 1510 are examples of means for generating a channel estimation for the frequency gap by using interpolation from portions of the channel estimations of the two adjacent frequency bands. The processing system 2420, receive processor 242, receive processor 282, and/or filter 1610 are examples of means for performing low-pass filtering on the collective channel estimation. The processing system 2420, receive processor 242, receive processor 282, and/or channel zeroing circuitry 1720 are examples of means for performing the channel zeroing. The processing system 2420, receive processor 242, receive processor 282, and/or channel zeroing circuitry 1720 are examples of means for zeroing one or more of the values having a magnitude less than or equal to a threshold. The processing system 2420, receive processor 242, receive processor 282, and/or channel zeroing circuitry 1720 are examples of means for performing channel zeroing according to a function of threshold, measured SNR and delay spread.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 220 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read- Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by an access terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that an access terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   an interface configured to:
      receive a plurality of channel estimation sequences, wherein each one of the plurality of channel estimation sequences is received on a respective one of a plurality of channels, each one of the plurality of channels having a respective one of a plurality of frequency bands; and
      receive a data payload on a channel having a frequency band including the plurality of frequency bands; and
   a processing system configured to:

generate a channel estimation for each one of the plurality of channels using the respective one of the plurality of channel estimation sequences;

generate a collective channel estimation based on the channel estimations; and perform channel equalization on the received data payload using the collective channel estimation.

2. The apparatus of claim 1, wherein the processing system is further configured to decode the data payload after the channel equalization to recover data from the data payload.

3. The apparatus of claim 1, wherein the interface is further configured to receive a header on a first one of the plurality of channels, and the reception of one of the channel estimation sequences on a second one of the plurality of channels substantially overlaps the reception of the header in time.

4. The apparatus of claim 1, wherein a first one of the plurality of frequency bands is approximately 400 megahertz, and each one of second and third ones of the plurality of frequency bands is approximately 1.76 gigahertz, the first frequency band being between the second and third frequency bands.

5. The apparatus of claim 1, wherein each one of the plurality of channel estimation sequences comprises one or more Golay sequences, and the processing system is further configured to generate the channel estimation for each one of the plurality of channels by performing cross-correlation on the respective one or more Golay sequences.

6. The apparatus of claim 1, wherein the processing system is further configured to convert each one of the channel estimations to a frequency domain using a Fourier transform, and to generate the collective channel estimation in the frequency domain based on the channel estimations in the frequency domain.

7. The apparatus of claim 1, wherein the processing system is further configured to perform a windowing operation on each one of the channel estimations to smooth out transitions in the channel estimation.

8. The apparatus of claim 1, wherein the processing system is further configured to center each one of two or more of the plurality of channels at approximately zero hertz by shifting the channel by a respective one of a plurality of shift frequencies.

9. The apparatus of claim 8, wherein the plurality of shift frequencies include at least one of approximately plus or minus 1.08 gigahertz, approximately plus or minus 2.16 gigahertz or approximately plus or minus 3.24 gigahertz.

10. The apparatus of claim 1, wherein two adjacent frequency bands of the plurality of frequency bands are separated by a frequency gap, and the processing system is further configured to generate a channel estimation for the frequency gap by using interpolation from portions of the channel estimations of the two adjacent frequency bands.

11. The apparatus of claim 10, wherein the interpolation comprises linear interpolation.

12. The apparatus of claim 1, wherein the processing system is configured to perform low-pass filtering on the collective channel estimation.

13. The apparatus of claim 1, wherein the processing system is further configured to perform channel zeroing on the collective channel estimation in a time domain.

14. The apparatus of claim 13, wherein the collective channel estimation comprises a plurality of values, and the processing system is further configured to perform the channel zeroing by zeroing one or more of the values having a magnitude less than or equal to a threshold or according to a function of at least one of threshold, measured SNR or delay spread.

15. A method for wireless communications, comprising:
receiving a plurality of channel estimation sequences, wherein each one of the plurality of channel estimation sequences is received on a respective one of a plurality of channels, each one of the plurality of channels having a respective one of a plurality of frequency bands;

generating a channel estimation for each one of the plurality of channels using the respective one of the plurality of channel estimation sequences;

generating a collective channel estimation based on the channel estimations;

receiving a data payload on a channel having a frequency band including the plurality of frequency bands; and performing channel equalization on the received data payload using the collective channel estimation.

16. The method of claim 15, further comprising converting each one of the channel estimations to a frequency domain using a Fourier transform, and wherein generating the collective channel estimation comprises generating the collective channel estimation in the frequency domain based on the channel estimations in the frequency domain.

17. The method of claim 15, further comprising centering each one of two or more of the plurality of channels at approximately zero hertz by shifting the channel by a respective one of a plurality of shift frequencies.

18. A wireless node, comprising:
at least one antenna;
a receiver configured to:
receive, via the at least one antenna, a plurality of channel estimation sequences, wherein each one of the plurality of channel estimation sequences is received on a respective one of a plurality of channels, each one of the plurality of channels having a respective one of a plurality of frequency bands; and receive, via the at least one antenna, a data payload on a channel having a frequency band including the plurality of frequency bands; and a processing system configured to:
generate a channel estimation for each one of the plurality of channels using the respective one of the plurality of channel estimation sequences;

generate a collective channel estimation based on the channel estimations; and perform channel equalization on the received data payload using the collective channel estimation.

* * * * *